(12) United States Patent
Gooding et al.

(10) Patent No.: US 7,792,716 B2
(45) Date of Patent: Sep. 7, 2010

(54) SEARCHING FOR AND IDENTIFYING AUTOMATED CLEARING HOUSE TRANSACTIONS BY TRANSACTION TYPE

(75) Inventors: Marie C. Gooding, Duluth, GA (US); Theresa M. Deggendorf, Coon Rapids, MN (US)

(73) Assignees: Federal Reserve Bank of Atlanta, Atlanta, GA (US); Federal Reserve Bank of Minneapolis, Minneapolis, MN (US)

( * ) Notice: Subject to any disclaimer, the term of this patent is extended or adjusted under 35 U.S.C. 154(b) by 1096 days.

(21) Appl. No.: 10/955,576

(22) Filed: Sep. 30, 2004

(65) Prior Publication Data
US 2005/0044043 A1 Feb. 24, 2005

Related U.S. Application Data

(63) Continuation-in-part of application No. 10/697,774, filed on Oct. 30, 2003.

(60) Provisional application No. 60/422,687, filed on Oct. 31, 2002.

(51) Int. Cl.
*G06Q 40/00* (2006.01)
(52) U.S. Cl. ............................ 705/35; 705/36 R
(58) Field of Classification Search .................. 705/38, 705/35, 36 R, 37, 705
See application file for complete search history.

(56) References Cited

U.S. PATENT DOCUMENTS

| | | | |
|---|---|---|---|
| 4,270,042 A | 5/1981 | Case | |
| 4,727,243 A | 2/1988 | Savar | 235/379 |
| 4,823,264 A | 4/1989 | Deming | 364/408 |
| 5,121,945 A | 6/1992 | Thomson et al. | |
| 5,175,682 A | 12/1992 | Higashiyama et al. | |
| 5,448,043 A | 9/1995 | Nakano et al. | |
| 5,532,464 A | 7/1996 | Josephson et al. | |
| 5,691,524 A | 11/1997 | Josephson | |
| 5,717,868 A | 2/1998 | James | 395/235 |
| 5,742,819 A | 4/1998 | Caccavale | |
| 5,761,510 A | 6/1998 | Smith et al. | |

(Continued)

FOREIGN PATENT DOCUMENTS

WO WO0030053 5/2000

OTHER PUBLICATIONS

SEI Investments Utilizes CheckFree RECON Securities to Automate Reconciliation Processes PR Newswire. New York: Jun. 24, 2002. p. 1.*

(Continued)

*Primary Examiner*—Lalita M Hamilton
(74) *Attorney, Agent, or Firm*—King & Spalding LLP

(57) ABSTRACT

Identifying automated clearing house ("ACH") transaction items processed by an ACH operator comprises processing ACH items for acceptance by the ACH operator. Each ACH item relates to an ACH transaction type. Each ACH item is associated with a corresponding ACH transaction type to which it is related. Each ACH item also is associated with parties involved in the transaction detailed in the ACH item. A request for information regarding a specified ACH transaction type is received from a requesting party. ACH items associated with the specified ACH transaction type and the requesting party are identified in response to receiving the request. Information regarding the identified ACH items is presented to the requesting customer.

31 Claims, 29 Drawing Sheets

U.S. PATENT DOCUMENTS

| | | | |
|---|---|---|---|
| 5,783,808 | A | 7/1998 | Josephson |
| 5,787,402 | A | 7/1998 | Potter et al. |
| 5,790,778 | A | 8/1998 | Bush et al. |
| 5,794,234 | A | 8/1998 | Church et al. |
| 5,825,003 | A | 10/1998 | Jennings et al. |
| 5,848,400 | A | 12/1998 | Chang ............... 705/35 |
| 5,852,812 | A | 12/1998 | Reeder |
| 5,940,813 | A | 8/1999 | Hutchings |
| 5,946,669 | A | 8/1999 | Polk |
| 5,956,700 | A | 9/1999 | Landry |
| 5,963,647 | A | 10/1999 | Downing et al. |
| 5,963,648 | A | 10/1999 | Rosen |
| 5,978,485 | A | 11/1999 | Rosen |
| 6,026,379 | A | 2/2000 | Haller et al. ............ 705/34 |
| 6,032,133 | A | 2/2000 | Hilt et al. |
| 6,061,665 | A | 5/2000 | Bahreman |
| 6,076,064 | A | 6/2000 | Ros |
| 6,076,074 | A | 6/2000 | Cotton et al. ............ 705/40 |
| 6,098,053 | A | 8/2000 | Slater |
| 6,119,107 | A | 9/2000 | Polk |
| 6,141,651 | A | 10/2000 | Riley et al. ............ 705/35 |
| 6,173,272 | B1 | 1/2001 | Thomas et al. ............ 705/42 |
| 6,205,433 | B1 | 3/2001 | Boesch et al. |
| 6,216,115 | B1 | 4/2001 | Barrameda et al. |
| 6,243,689 | B1 | 6/2001 | Norton |
| 6,246,999 | B1 | 6/2001 | Riley et al. ............ 705/30 |
| 6,269,345 | B1 | 7/2001 | Riboud |
| 6,304,860 | B1 | 10/2001 | Martin, Jr. et al. |
| 6,317,745 | B1 | 11/2001 | Thomas et al. ............ 707/100 |
| 6,408,284 | B1 | 6/2002 | Hilt et al. |
| 6,598,028 | B1 | 7/2003 | Sullivan et al. |
| 6,615,258 | B1 | 9/2003 | Barry et al. |
| 6,629,081 | B1 | 9/2003 | Cornelius et al. |
| 6,721,715 | B2 | 4/2004 | Nemzow |
| 6,754,640 | B2 | 6/2004 | Bozeman |
| 6,829,590 | B1 | 12/2004 | Greener et al. |
| 6,868,408 | B1 | 3/2005 | Rosen |
| 6,873,972 | B1 | 3/2005 | Marcial et al. |
| 6,892,184 | B1 | 5/2005 | Komen |
| 2001/0034682 | A1 | 10/2001 | Knight et al. |
| 2002/0016769 | A1 | 2/2002 | Barbara et al. ............ 705/40 |
| 2002/0029194 | A1 | 3/2002 | Lewis et al. |
| 2002/0032642 | A1 | 3/2002 | Chichilnisky |
| 2002/0035561 | A1 | 3/2002 | Archer et al. |
| 2002/0038305 | A1 | 3/2002 | Bahl et al. |
| 2002/0055904 | A1 | 5/2002 | Mon |
| 2002/0072942 | A1 | 6/2002 | Kuykendall et al. |
| 2002/0077971 | A1 | 6/2002 | Allred |
| 2002/0082962 | A1 | 6/2002 | Farris et al. |
| 2002/0087455 | A1 | 7/2002 | Tsagarakis et al. |
| 2002/0099656 | A1 | 7/2002 | Poh Wong |
| 2002/0120537 | A1 | 8/2002 | Morea et al. |
| 2002/0120846 | A1 | 8/2002 | Stewart et al. |
| 2002/0161692 | A1 | 10/2002 | Loh et al. |
| 2002/0161707 | A1 | 10/2002 | Cole |
| 2002/0185529 | A1 | 12/2002 | Cooper et al. |
| 2003/0018554 | A1 | 1/2003 | Lyftogt et al. |
| 2003/0024979 | A1 | 2/2003 | Hansen et al. |
| 2003/0033228 | A1 | 2/2003 | Bosworth-Davies et al. |
| 2003/0050892 | A1 | 3/2003 | Clynes |
| 2003/0055756 | A1 | 3/2003 | Allan |
| 2003/0065594 | A1 | 4/2003 | Murphy |
| 2003/0065941 | A1 | 4/2003 | Ballard et al. |
| 2003/0070080 | A1 | 4/2003 | Rosen |
| 2003/0105710 | A1 | 6/2003 | Barbara et al. |
| 2003/0126094 | A1 | 7/2003 | Fisher et al. |
| 2003/0144942 | A1 | 7/2003 | Sobek ............ 705/36 |
| 2003/0158811 | A1 | 8/2003 | Sanders et al. ............ 705/39 |
| 2003/0167223 | A1 | 9/2003 | Pledereder et al. |
| 2003/0167237 | A1 | 9/2003 | Degen et al. |
| 2003/0177087 | A1 | 9/2003 | Lawrence |
| 2003/0182227 | A1 | 9/2003 | Guzman ............ 705/39 |
| 2003/0187783 | A1 | 10/2003 | Arthus et al. |
| 2003/0187792 | A1 | 10/2003 | Hansen et al. |
| 2003/0208439 | A1 | 11/2003 | Rast ............ 705/38 |
| 2003/0208440 | A1 | 11/2003 | Harada et al. |
| 2003/0208445 | A1 | 11/2003 | Compiano |
| 2003/0220878 | A1 | 11/2003 | Degen et al. |
| 2003/0229586 | A1 | 12/2003 | Repak ............ 705/39 |
| 2003/0233319 | A1 | 12/2003 | Lawrence ............ 705/39 |
| 2004/0002914 | A1 | 1/2004 | Munro |
| 2004/0006533 | A1 | 1/2004 | Lawrence |
| 2004/0024709 | A1 | 2/2004 | Yu et al. |
| 2004/0030621 | A1* | 2/2004 | Cobb ............ 705/35 |
| 2004/0093305 | A1 | 5/2004 | Knight et al. ............ 705/40 |
| 2004/0109596 | A1 | 6/2004 | Doran |
| 2004/0117299 | A1 | 6/2004 | Algiene et al. |
| 2004/0128240 | A1 | 7/2004 | Yusin |
| 2004/0138973 | A1 | 7/2004 | Keis et al. |
| 2004/0143621 | A1 | 7/2004 | Fredrickson et al. |
| 2004/0148255 | A1 | 7/2004 | Beck et al. |
| 2004/0153403 | A1 | 8/2004 | Sadre |
| 2004/0199463 | A1 | 10/2004 | Deggendorf |
| 2004/0205011 | A1 | 10/2004 | Northington et al. ............ 705/35 |
| 2004/0236646 | A1 | 11/2004 | Wu et al. |
| 2005/0004872 | A1 | 1/2005 | Gavin et al. |
| 2005/0021454 | A1 | 1/2005 | Karpovich et al. |
| 2005/0044043 | A1 | 2/2005 | Gooding et al. |
| 2005/0086136 | A1 | 4/2005 | Love et al. |
| 2005/0167481 | A1 | 8/2005 | Hansen et al. |
| 2005/0177464 | A1 | 8/2005 | Komen et al. |
| 2005/0209961 | A1 | 9/2005 | Michelsen et al. |

OTHER PUBLICATIONS

Clearing House Lets Depositories Share Fraud Data Steve Bills. American Banker. New York, N.Y.: Oct. 12, 2001. vol. 167, Iss. 196; p. 9.*

Eurogiro, Development of Interface Between FED and Eurogiro, Request for Proposal, Jan. 14, 2003, Uwe Holmsgaard, Eurogiro Network A/S.

PC AIMS User's Guide, Credit Controls, pp. 10-1 to 10-8, Feb. 25, 2002.

EPN Voice Response System (RALPH), Applicants submit that this document was published prior to Sep. 30, 2003.

NACHA Rule Amendment for Third-Party Service Providers: A Case Study, Chris Daniel, Partner, Alston & Bird LLP.

The Impact of NACHA Rule Changes on Third Party Service Providers, Dec. 15, 2004, Deborah Shaw, Senior Director of Network Services, NACHA.

NACHA Third Party ACH Rules: Improving Risk Management for Financial Institutions, Dec. 15, 2004, Mary O'Tole, Vice President, Bank of America.

Fedline User Guide, ACH, Version 2.4, Mar. 2002, including Fedline User Guide, Host Communications, Version 2.4, Jun. 1997.

ACH Goes Across the Border, South Florida Banking Institute, Vicki Anderson, Retail Payments Office, Federal Reserve System, Oct. 29, 2001.

William B. Nelson, ACH News From Europe, Payments Journal, Jan./Feb. 2002.

International ACH—Expanding the Gateway Concept Beyond Canada, Vicki Anderson, Retail Payments Office, Federal Reserve System, Apr. 15, 2002.

International Direct Deposit Technical Walkthru, Prepared for IRPPO, Oct. 9, 2002.

FedACH$^{SM}$ Product Development Discussion, Federal Reserve Financial Services, U.S. Bank, Nov. 30, 2001.

International Direct Deposit Overview, Electronic Payments, EROC, Federal Reserve Bank of New York, Oct. 9, 2002.

Overview of the Federal Reserve System's Check to ACH Conversion (CTAC) Product, Presented Feb. 15, 2002.

Overview, Federal Reserve and Check to ACH Conversion (CTAC), Presented to SWACHA—The Electronic Payments Resource, Jul. 31, 2002.

The Federal Reserve & Check-to-ACH Conversion, NACHA Electronic Check Conference, Sep. 23-24, 2002, Terry Roth, Retail Payments Office of the Federal Reserve System.

2002 ACH Rules, A Complete Guide to Rules & Regulations Governing the ACH Network, National Automated Clearing House Association, Copyright 2002. Attached pages: 1) Understanding the ACH Network: An ACH Primer, pp. 1-17; 2) Operating Rules of the National Automated Clearing House Association, Article Eight, pp. 28-29; 3) Operating Guidelines of the National Automated Clearing House Association: Section II, Chapter III, pp. 40-45; and Section IV, Chapter VI, pp. 120-140; and 4) Federal Reserve Bank Uniform Operating Circular [No. 4] on Automated Clearing House Items, Jun. 25, 2001.

U.S. Appl. No. 60/416,663, filed Oct. 7, 2002, Yusin.

* cited by examiner

100

1600

| | FedACH | | | | | 1612 | -- Go To -- | Go |
|---|---|---|---|---|---|---|---|---|

FedLINE

Search for File
091194077 FEDWEB DEMO BANK, PLEASANT TOWN MN

1602 →

General
- About Our Services
- Privacy Policy
- Legal Notices
- Contact Us for Help
- Logout ◉ Originated   Date Range From [01/16/2002] To [01/18/2002] — 1616
○ Received   FileID [          ] (Optional)
1618

Settlement Info
- Settlement Summaries

1614

[Reset] [View List]  — 16

1603 — File Information
1604 — Search for File
    — Transmission Summary

[Print] [Download]

Originated Files
* GRAND TOTALS *

1605 — Batch Information
    — Search for Batch

All Files: 6    Batches: 14011    Debits: 1,307,558.45
Accepted Files: 5    Item/Addn: 198982    Credits: 5,120,827.85  — 1622
Pended Files: 0
Rejected Files: 1

1606 — Item Information
1607 — Search for Item
    — Derive a Return or NOC

| File Status | Process Date | Receive Date | Receive Time | FileID Modifier | Batch Count | Item Addenda Count | Debits | Credits |
|---|---|---|---|---|---|---|---|---|
| Rejected | 01/16/02 | 01/16/02 | 11:15 | 0116B | 2793 | 39757 | 260,879.09 | 1,023,532.59 |
| Accepted | 01/16/02 | 01/16/02 | 11:15 | 0116B | 2793 | 39757 | 260,879.09 | 1,023,532.59 |
| Accepted | 01/16/02 | 01/16/02 | 11:15 | 0116B | 2793 | 39757 | 260,879.09 | 1,023,532.59 |
| Accepted | 01/16/02 | 01/16/02 | 11:15 | 0116B | 2793 | 39757 | 260,879.09 | 1,023,532.59 |
| Accepted | 01/16/02 | 10/07/02 | 20:45 | 1007B | 2793 | 39757 | 260,879.09 | 1,023,532.59 |
| Accepted | 01/18/02 | 01/18/02 | 07:00 | 0118A | 40 | 197 | 3,163.00 | 3,165.00 |

Customer Profiles
- Search for Customer 1626                    1628

Figure 16

FedACH

091194077 FED WEB DEMO BANK, PLEASANT TOWN MN

Search for Batch

- ◉ Originated
- ○ Received

Process Data Range
From 01/24/2002 To 01/24/2002

ABA:

SEC Code: ALL - ALL SEC CODES
Batch Status: All
Batch Number:
Settlement Date: __/__/__ MM/DD/YY
Company Name:

Debit Totals:
Credit Totals:
Company ID:

Reset | View List

Originated File Information

| File Status | Proc Date | Settle Date | SEC | Orig ABA | Company ID | File ID Mod | Company Name | Batch Cnt | Item Addn Cnt | Debits | Credits |
|---|---|---|---|---|---|---|---|---|---|---|---|
| Accepted | 01/24/02 | 01/22/02 | | | | 0122A | | 46 | 197 | 3,163.00 | 3,185.00 |

Originated Batch Information

| Batch Status | | Proc Date | Settle Date | SEC | Orig ABA | Company ID | File ID Mod | Company Name | Batch Nbr | Item Addn Cnt | Debits | Credits |
|---|---|---|---|---|---|---|---|---|---|---|---|---|
| ☐ Acpt | | 01/25/02 | 01/25/02 | PPD | 091194077 | COMPANY ID | | ** COMPANY | 1 | 3 | 3.00 | 0.00 |
| ☐ Acpt | | 01/25/02 | 01/25/02 | CCD | 091194077 | COMPANY ID | | ** COMPANY | 2 | 3 | 0.00 | 7.00 |
| ☐ Acpt | | 01/25/02 | 01/25/02 | ARC | 091194077 | COMPANY ID | | ** COMPANY | 3 | 2 | 5.00 | 6.00 |
| ☐ Acpt | | 01/25/02 | 01/25/02 | WEB | 091194077 | COMPANY ID | | ** COMPANY | 4 | 4 | 8.00 | 7.00 |
| ☐ Acpt | | 01/25/02 | 01/25/02 | PPD | 091194077 | COMPANY ID | | ** COMPANY | 5 | 7 | 20.00 | 22.00 |

Print | Download

Figure 23

FedACH

Search for Item
09194077 FEDWEB DEMO BANK, PLEASANT TOWN MN

○ Originated    Process Date Range
◉ Received      01/25/2002 to 01/25/2002

Enter Trace Number OR Receiving ABA and Amount ($). All other fields are optional.
(Required Fields)

Trace Number [_____]
OR
Receiving ABA [09194077]    Amount ($) [90.00]

(Optional Fields)  MM/DD/YY
Effective Entry Date  [__/__/__]    Account Number [_____]
Settlement Date       [__/__/__]    Comp/Indiv Name [_____]

[Reset] [View List]

Item Trace

| Sel | RFI | Eff Date | Company Name | Individual Name | Amount ($) |
|---|---|---|---|---|---|
| 1 | 091194077 | 05/02/02 | US TREASURY 220 | INDIVIDUAL NAME 1 | 90.00 |
| 2 | 091194077 | 05/02/02 | US TREASURY 220 | INDIVIDUAL NAME 2 | 90.00 |
| 3 | 091194077 | 05/02/02 | US TREASURY 220 | INDIVIDUAL NAME 3 | 90.00 |
| 4 | 091194077 | 05/02/02 | US TREASURY 220 | INDIVIDUAL NAME 4 | 90.00 |
| 5 | 091194077 | 05/02/02 | US TREASURY 220 | INDIVIDUAL NAME 5 | 90.00 |
| 6 | 091194077 | 05/02/02 | US TREASURY 220 | INDIVIDUAL NAME 6 | 90.00 |
| 7 | 091194077 | 05/02/02 | US TREASURY 220 | INDIVIDUAL NAME 7 | 90.00 |
| 8 | 091194077 | 05/02/02 | US TREASURY 220 | INDIVIDUAL NAME 8 | 90.00 |
| 9 | 091194077 | 05/02/02 | US TREASURY 220 | INDIVIDUAL NAME 9 | 90.00 |

FEDLINE

General
- About Our Services
- Privacy Policy
- Legal Notices
- Contact Us for Help
- Logout

Settlement Info
- Settlement Summaries

File Information
- Search for File
- Transmission Summary

Batch Information
- Search for Batch

Item Information
- Search for Item
- Derive a Return or NOC

Customer Profiles
- Search for Customer

SEARCHING FOR AND IDENTIFYING AUTOMATED CLEARING HOUSE TRANSACTIONS BY TRANSACTION TYPE

RELATED PATENT APPLICATIONS

This application is a continuation-in-part of U.S. Non-Provisional patent application Ser. No. 10/697,774, filed Oct. 30, 2003 and entitled "Method and System for Tracking and Reporting Automated Clearing House Transaction Status," which claims priority to U.S. Provisional Patent Application No. 60/422,687, filed Oct. 31, 2002 and entitled "On-Line Financial Information Services." The subject matter of each priority application identified above is hereby fully incorporated herein by reference.

FIELD OF THE INVENTION

The present invention relates to the processing of automated clearing house ("ACH") financial transactions by an ACH operator. Particularly, the present invention relates to searching for and identifying ACH items that have been processed by an ACH operator, based on the transaction type of each ACH item.

BACKGROUND OF THE INVENTION

One form of electronic funds transfer ("EFT") currently used domestically is known as direct payment or direct deposit instruments (hereinafter generally referred to as "direct payment"). A direct payment instrument is an electronically transmitted instruction to credit or debit a particular account. For example, a company can use direct payment to credit the accounts of its employees, customers, vendors, and beneficiaries. Direct payment instruments are becoming increasingly popular as conventional payment methods, such as checks, decrease in popularity. Because the transaction is performed electronically, direct payment instruments offer convenience and reliability. An electronic system that supports direct payment instruments in the United States is referred to as the Automated Clearing House ("ACH").

The ACH is a nationwide system supported by several operators, including the Federal Reserve Banks and other institutions. The ACH network is governed by a set of rules administered by the National Automated Clearing House Association ("NACHA"). The ACH network provides clearing of generally small value, repetitive and one-time payments among banks that participate in the ACH network. Financial institutions collect transactions and package them in batched ACH files according to the NACHA rules for forwarding to other institutions via the ACH network.

The ACH is a payments mechanism that replaces paper payments with electronic transactions and provides a more cost-effective and efficient alternative to writing, collecting, and processing paper checks, typically for recurring payments of small dollar amounts. ACH transactions are processed through the ACH network, a nationwide, batch-oriented electronic funds transfer system governed by the ACH rules. The ACH network provides for the inter-bank clearing of electronic payments (credits and debits) for participating financial institutions.

ACH offers financial institutions, companies, consumers, and others an efficient, alternative payment method to writing, collecting, and processing paper checks. Throughout this specification, any reference to the term "company" is intended to be representative of the originator or receiver of electronic ACH entries and does not imply exclusion of other types of organizations. Transactions are created by an originator and are delivered to an originating depository financial institution ("ODFI"). The ODFI may act as their own sending point, or it may use a third party sending point, to electronically transmit the information in a file to an ACH operator. The ACH operator can comprise the Federal Reserve Banks or another entity.

The file comprises batches, and each batch represents a series of ACH transaction items pertaining to one originator and payment type. ACH transaction items are individual electronic debits or credits formatted to meet National Automated Clearing House Association ("NACHA") standards. Once received by the ACH operator, the transaction items are sorted and prepared for delivery to a receiving depository financial institution ("RDFI"). The RDFI may act as its own receiving point, or it may use a third party receiving point, to electronically receive a file from the ACH operator. The ACH Operator may provide ACH accounting information in a machine-readable format to facilitate the automation of accounting information for participating DFIs.

The following provides definitions of the ACH system participants:

(1) ACH Operator: The Federal Reserve Banks or another operator which receives transaction items from an ODFI through its sending point, distributes the items to appropriate RDFIs or their third party processor(s), and performs the settlement functions (crediting and debiting of accounts) for the affected financial institutions. In some cases, operators may not perform the settlement function.

(2) Originator: A person or organization that agrees to initiate ACH entries into the payments system according to an arrangement with a receiver. The originator is usually a company that originates an ACH item to a consumer's account or another company's account. The originator is responsible for obtaining and retaining any required authorization from the receiver.

(3) Originating Depository Financial Institution ("ODFI"): A financial institution that receives the payment instructions from originators and forwards the items to the ACH operator.

(4) Receiver: A person or organization that has authorized an originator to initiate an ACH entry to the receiver's account at their RDFI.

(5) Receiving Depository Financial Institution ("RDFI"): A financial institution that receives ACH transactions from the ACH operator and posts them to the accounts of its customers (receivers).

(6) Receiving Point: The point to which files from the ACH operator are delivered for the RDFI. An RDFI may designate itself or another entity as the receiving point.

(7) Sending Point: The actual point from which a file is communicated to the ACH operator for the ODFI. The ODFI may designate itself or another entity as its sending point. The ODFI may have multiple sending points.

The following provides a description of the anatomy of an ACH file. ACH files comprise groups of ACH items in batches that must be in a specific sequence or the ACH operator will not process the file. Each ACH file has one file header, which primarily comprises immediate origin and destination information. Fields in the file header include the local ACH operator routing number, sending point or receiving point routing number, file date, file time, record block, destination name of the ACH operator, and origin name.

Each batch comprises one or more ACH items and contains a batch header record that identifies the originator and a batch control record. ACH files can comprise more than one batch. Depending on who creates the batch, either the ODFI or the originator will enter the data in the batch header. Fields in the batch header comprise the ODFI routing number, company name, company entry description (which prints on the customer statement), originator identification, batch number, effective entry date, and standard entry class code.

Each ACH batch also comprises a batch control record that announces the end of a batch. The batch control record comprises totals for the batch, such as number of items, total dollar amounts, and a summation (algorithm) of the RDFI identification. Each batch must have a control record before another batch can begin. Throughout this specification, reference to a batch header can comprise information from a batch control record.

Each ACH item comprises an item detail record. Fields in the item detail record comprise the dollar amount, the receiver's RDFI name and account number, the transaction code for the receiver's type of account, trace number, and RDFI routing number. Each item detail record must be constructed in accordance with the NACHA record layout according to the Standard Entry Class Code of the batch.

Each ACH file also comprises a file control record at the end of the last batch in the ACH file. The file control record announces the end of the file and includes a summary of all of the batch control records. Throughout this specification, reference to a file header can comprise information from a file control record.

Each file header identifies the immediate origin (sending point or ACH operator) and destination (receiving point or ACH operator). A file may comprise batches and items for one or more ODFIs. A file can comprise items for numerous RDFIs. Each batch comprises only one company's items. Input batches, which are being sent to the ACH operator by the ODFI, can comprise items for multiple RDFIs. Output batches, which are coming from the ACH operator, comprise items for only one RDFI.

In a conventional ACH system, a sending customer (the party communicating the file to the ACH operator), such as an ODFI, accesses a DOS terminal or uses a vendor supplied origination package to create an ACH file. The ACH file comprises at least one ACH batch comprising at least one ACH item. After creating the file, the sending customer (the party communicating the file to the ACH operator) confirms the credit and debit transaction totals in the created file. Then, an approving employee approves the created file for transfer to the ACH operator.

After approving the file, the sending customer establishes a direct connection between the DOS terminal and a mainframe computer at the ACH operator and communicates the ACH file to the mainframe computer. The mainframe computer does not acknowledge receipt of the ACH file.

The mainframe computer determines if it will accept the ACH file for further processing and settlement. To determine whether to accept the ACH file, the mainframe computer examines the file header information to determine if it conforms to the NACHA required format and content. If the file header information conforms to the required information, then the mainframe computer accepts the file. In that case, the mainframe computer performs a similar examination of each batch header in the file to determine whether to accept the respective batches. If the batch header information conforms to the required information, then the mainframe computer accepts the respective batch. Then, the mainframe computer examines the item detail record for each item in the accepted batches to determine whether it conforms to the required information. If yes, then the mainframe computer accepts the respective items. The mainframe computer then settles the accepted ACH items by debiting and crediting the appropriate accounts.

If the file header, batch header, or item detail record do not conform to the required information, then the mainframe computer rejects the respective file, batch, or item. In that case, the mainframe computer will not settle the rejected batches or files and will adjust the settlement on rejected items. Accordingly, the sending customer must correct the errors in the information and resubmit the rejected file, batch, or item in a new file for acceptance.

In the conventional system, the sending customer cannot obtain the status of files, batches, or items until the mainframe computer attempts to process each file, batch, or item. Periodically, the mainframe computer will generate a report for the sending customer to indicate the status of received ACH files, and the sending customer can login and download the report. That status includes only "processed" (accepted), "pended" (held until the sending point is consulted), or "rejected." For files that are pended or rejected, only a general description of the error is included. If a particular file has not been processed, then the sending customer will not receive any status information for that file. The sending customer does not receive any information for accepted batches or items. If the sending customer has specific information for a particular item, then the sending customer can request a status for the particular item through an item trace report. The item trace function is available only on items from the previous ten processing days.

Conventional systems also have several deficiencies regarding initiating an ACH item return or notification of change ("NOC"). For example, a conventional interactive voice response ("IVR") system can allow a customer to initiate an item-level return or NOC. However, the customer must input a trace number, dollar amount, and RDFI routing number for a particular item to initiate the item-level transaction. If the mainframe computer can identify the particular item that matches the trace number, then it describes that item to the customer. Then, the customer can approve the particular item for a return or NOC. After approval, the mainframe computer can derive a new item from the particular item and can generate a batch and file for the new item. However, the customer cannot search for an item based on multiple criteria, such as amount, routing number, process/settlement date, account number, and company/individual name. Additionally, the conventional mainframe computer cannot return multiple items for selection by the customer, and the customer cannot select multiple items to initiate multiple returns or NOCs. The conventional system also cannot initiate an item-level dishonored return or contested dishonored return.

Additionally, conventional systems do not provide meaningful information to customers regarding multiple ACH items processed by the ACH operator. The item trace function of a conventional system only allows a customer to search the ACH operator's database for a particular ACH item based on search criteria that includes information specific to that particular ACH item. The conventional item trace function does not allow customers to search for multiple ACH items because the scope of the search results would be too large to provide meaningful data. For example, most customers are a party to hundreds, thousands, or tens of thousands of ACH transactions per day. If the customer desired to review one or more of those transactions, the conventional system could provide only a list of all ACH items processed during a specified time period. Because that list would encompass the hundreds, thousands, or tens of thousands of ACH transactions processed for that customer during the specified time period, the search results are not useful to the customer and therefore are not provided by the conventional systems. Thus, conventional systems limit searching of ACH transactions to a particular ACH item based on search criteria that identifies the particular ACH item.

Accordingly, a need exists in the art for a method and system that can search for and identify groups of ACH items processed by an ACH operator, based on search criteria provided by a customer. Particularly, a need exists in the art for searching for and identifying processed ACH items based on the ACH items' type of ACH transaction. A further need exists in the art for presenting the identified ACH items to the customer that provided the search criteria.

SUMMARY OF THE INVENTION

The present invention can allow customers to receive information regarding processed ACH items from an ACH operator, based on different types of ACH transactions. The ACH operator can associate an ACH transaction type with each ACH item processed by the operator. A customer can request information for ACH items of a specified type of ACH transaction. The operator can search its database for matching ACH items that are associated with the specified ACH transaction type and can present the matching ACH items to the customer. According to one aspect, the types of ACH transactions can comprise a return, a dishonored return, a contested dishonored return, an international return, a notification of change, and a refused notification of change. Allowing a customer to search for ACH items by ACH transaction type allows the operator to present a meaningful set of search results from the multitude of ACH items processed by the operator for each customer.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

FIG. 16 illustrates a file search user interface for allowing a customer to search for originated or received ACH files according to an exemplary embodiment of the present invention.

FIG. 23 illustrates a search for batch user interface for searching for and presenting ACH batch information according to an exemplary embodiment of the present invention.

FIG. 24 illustrates a search for item user interface for searching for and presenting ACH items according to an exemplary embodiment of the present invention.

FIG. 26 illustrates a data entry user interface for deriving an ACH return item according to an exemplary embodiment of the present invention.

DETAILED DESCRIPTION OF EXEMPLARY EMBODIMENTS

Figure 1:
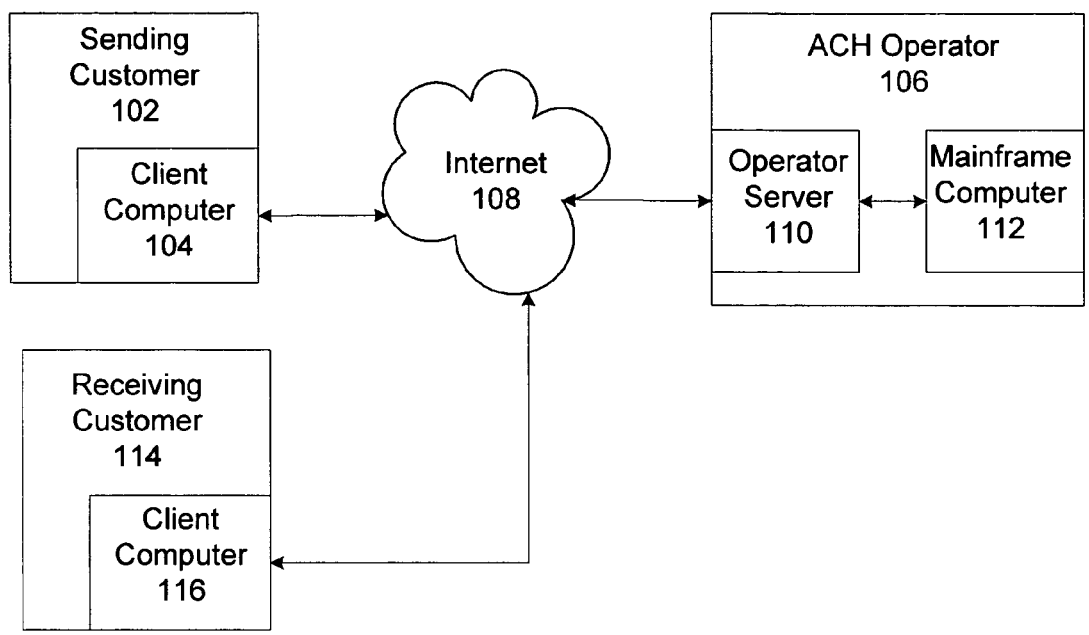
FIG. 1 is a block diagram depicting a system for tracking and reporting the status of automated clearing house ("ACH") transactions processed by an ACH operator according to an exemplary embodiment of the present invention.

The present invention can provide a meaningful set of search results from a multitude of processed ACH items by allowing customers to search for and identify processed ACH items based on a type of ACH transaction. An ACH operator processes ACH items received from customers for acceptance. The operator can associate a type of ACH transaction with each processed ACH item in its electronic database. Then, the operator can allow a customer to search the operator's database for ACH items of a particular ACH transaction type. The customer can submit search criteria specifying an ACH transaction type to the operator. The operator can search its database for processed ACH items that match the search criteria and can identify and present the matching ACH items to the customer. The types of ACH transactions can comprise a return, a dishonored return, a contested dishonored return, an international return, a notification of change, a refused notification of change, and other suitable types of ACH transactions.

The present invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Referring to the drawings, in which like numerals represent like elements, aspects of the exemplary embodiments will be described. Throughout the following description, the terms "customer," "sending customer," and "receiving customer" can refer to any of the following parties, depending on a party's role in a transaction: originator, ODFI, sending point, settlement point, receiving point, RDFI, or receiver.

Figure 2:
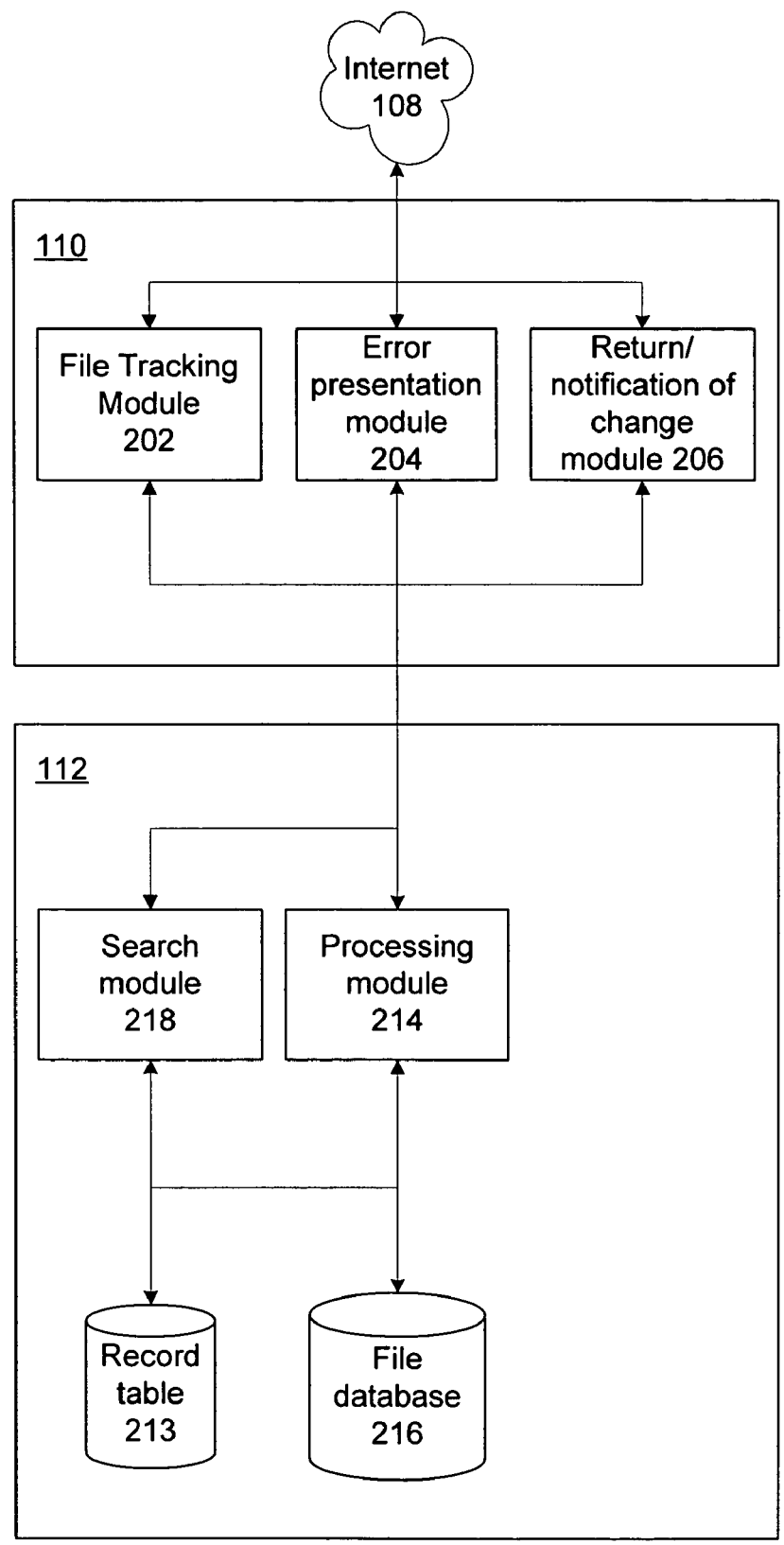
FIG. 2 is a block diagram depicting components of an operator server and a mainframe computer according to an exemplary embodiment of the present invention.

FIG. 1 is a block diagram depicting a system 100 for tracking and reporting the status of automated clearing house ("ACH") transactions processed by an ACH operator 106 according to an exemplary embodiment of the present invention. FIG. 2 is a block diagram depicting components of the operator server 110 and the mainframe computer 112 of the system 100 according to an exemplary embodiment of the present invention. The system 100 will be described with reference to FIGS. 1 and 2.

File tracking involves tracking the status of ACH files, ACH batches, and ACH items during processing of ACH transactions to allow reporting of current file, batch, and item status to a customer. In a typical ACH transaction, a sending customer 102 initiates an ACH transaction with a receiving customer 114 by forwarding the ACH transaction to the settlement ACH operator 106. The sending customer 102 communicates each ACH transaction as an ACH item in an ACH file. Each ACH file comprises one or more ACH batches that each comprises one or more ACH transaction items.

As shown in FIG. 1, the sending customer 102 uses a sending customer client computer 104 to access an operator server 110 via a distributed computer network, such as the Internet 108. The sending customer client computer 104 comprises standard browser technology that accesses a web site hosted on the operator server 110. The web site provides access to ACH transaction processing by the ACH operator 106.

To begin ACH transaction processing, the sending customer 102 uses the sending customer client computer 104 to establish a secure session with the web site hosted on the operator server 110. Then, the sending customer 102 communicates an ACH file to the operator server 110 via the Internet 108. The ACH file comprises one or more batches, each comprising one or more ACH transaction items.

A file tracking and reporting module 202 of the operator server 110 communicates a message indicating that transmission of the file has begun to the sending customer client computer 104 via the Internet 108. The file tracking and reporting module 202 also updates a record table 213 in a mainframe computer 112 with identification information for the ACH file and a current status of "file not confirmed." The identification information can comprise information identifying the sending customer 102, the ACH credit and debit transaction totals for the ACH file, batches, and items, the originator responsible for the ACH batches and items, and other identifying information. The file tracking and reporting module 202 also records in the record table 213 the date and time of the file status change to "file not confirmed."

Next, the operator server 110 communicates a request to the sending customer client computer 104 via the Internet 108 to verify that the operator server 110 received the complete ACH file. The request asks the sending customer 102 to confirm the ACH transaction total for all ACH credit and debit transactions included in the file. If the ACH transaction total is not correct, then the sending customer 102 cancels the ACH file transfer and starts over. If the ACH transaction total is correct, then the sending customer 102 confirms the total by communicating a confirmation message from the sending customer client computer 104 to the operator server 110 via the Internet 108.

Upon receipt of the sending customer 102's confirmation, the file tracking and reporting module 202 updates the record table 213 in the mainframe computer 112 to indicate a current status of "confirmed, awaiting approval." Then, the operator server 110 pends the ACH file by suspending processing until approved by a sending customer 102 employee with authority to approve processing of the ACH file. Typically, the approving employee is not the same employee that communicated the ACH file to the ACH operator 106. Accordingly, the system provides dual control of the ACH transactions to increase security of the ACH transactions.

The approving employee uses the sending customer client computer 104 to access the operator server 110 via the Internet 108, views the ACH file awaiting approval, and either approves or rejects the pended ACH file. If the approving employee rejects the ACH file, then the operator server 110 deletes the ACH file, and the process ends. If the approving employee approves the pending ACH file, then the file tracking and reporting module 202 updates the record table 213 in the mainframe computer 112 to indicate a status of "approved." The file tracking and reporting module 202 also records the date and time that the file status changed to "approved." To approve the pended ACH file, the approving employee can communicate an approval message from the sending customer client computer 104 to the operator server 110 via the Internet 108.

The operator server 110 communicates the approved ACH file to a file database 216 in the mainframe computer 112 for processing by an ACH processing module 214. The processing module 214 processes the approved ACH file, including the batches and items in the file, to determine whether to accept the ACH file, the ACH batches, and each ACH item. To determine whether to accept the ACH file, the processing module 214 examines the NACHA required information in the file header to determine if all of the required information is present and in the proper format. Another part of the validation process examines if the relationships between the parties in the transactions match the legal relationships as defined in an ACH customer directory database. If the NACHA required information is present and properly formatted and the relationships are correct, then the processing module 214 accepts the file for ACH transaction processing. In that case, the processing module 214 updates the record table 213 to indicate a file status of "accepted" and records the date and time of the status change.

If NACHA required information is missing or not properly formatted or the relationships are not correct, then the processing module 214 updates the record table 213 to indicate a status of "rejected" and records the date and time of the file status change. At this point, the customer can use client computer access to ACH file information through the operator server 110 to correct the errors in the ACH file through ordinary processes or means at the customer site. Then, the sending customer 102 can communicate a new file (including customer-corrected information) to the ACH operator 106 for processing. After the sending customer 102 corrects the errors, then the processing module 214 processes the new ACH file, as previously discussed.

During processing, the processing module 214 can conditionally pend processing of the ACH file in response to certain conditions. In exemplary embodiments, the conditions that will pend processing of an ACH file comprise (1) when the immediate origin, file date, id and creation time are equal to a previously accepted file, and (2) when the current file contains exactly the same debit and credit dollar amounts as found in a previously processed file. Other conditions that pend processing of an ACH file are within the scope of the present invention. If the processing module 214 pends processing, the processing module 214 updates the record table 213 to indicate a file status of "pending" and records the date and time of the file status change. Then, the ACH operator 106 contacts the sending customer 102 of the pended file to communicate the condition(s) causing the file to pend, and the ACH operator 106 will release or reject the file according to sending customer instructions. When processing of the pended ACH file begins, the processing module 214 updates the record table 213 to indicate the current file status and records the date and time of the file status change.

The processing module 214 also processes each ACH batch in the ACH file to determine whether to accept each batch. To determine whether to accept an ACH batch, the processing module 214 examines the NACHA required information in the batch header to determine if all of the required information is present and in the proper format and to determine if the relationships between the parties in the transactions match the legal relationships as defined in the ACH customer directory database. Similar to the ACH file processing discussed previously, the processing module 214 examines the batches and updates the record table 213 to indicate the proper batch status of "accepted," "rejected," or "pending."

The processing module 214 also processes each ACH item in each ACH batch to determine whether to accept each item. To determine whether to accept an ACH item, the processing module 214 examines the NACHA required information in the item detail record to determine if all of the required information is present and in the proper format and that the relationships are correct. Similar to the ACH file and batch processing discussed previously, the processing module 214 examines the items and updates the record table 213 to indicate the proper item status of "accepted" or "rejected."

For each ACH item, the processing module 214 also records in the record table 213 a settlement date. The settlement date is the date on which the ACH operator 106 will credit and debit the appropriate accounts at the ACH operator 106 to settle the ACH transaction item. The settlement date initially comprises the future date of settlement until the accounts are debited and credited. Then, the settlement date reflects the actual settlement date of the ACH batch.

The processing module 214 parses the ACH items from the ACH file by receiving customer 114 and creates an outgoing ACH file for each receiving customer 114. The outgoing ACH file for each receiving customer 114 comprises at least one ACH batch having at least one ACH item. Then, the processing module 214 updates the record table 213 with identification information for the outgoing ACH file and indicates a status of "ready" for the ACH file. A "ready" status indicates that the file is ready for downloading by the receiving customer 114. The processing module 214 also records the date and time of the status change.

A receiving customer 114 uses a receiving customer client computer 116 to access the operator server 110 via the Internet 108. The receiving customer 114 communicates a query to the operator server 110 via the Internet 108. The query requests a list of files identified as the receiving customer's and having a status of "ready." A search module 218 searches the record table 213 for outgoing ACH files that match the query and communicates the matching files to the file tracking and reporting module 202 for presentation to the receiving customer 114 via the receiving customer client computer 116. The receiving customer 114 selects and downloads the desired ACH file from the file database 216 to its client computer via the Internet 108. Then, the file tracking and reporting module 202 updates the record table 213 to indicate a status of "downloaded" for the outgoing ACH file and records the date and time of the file status change.

As discussed, the file tracking system 100 records the status of an ACH file, batch, and item for each processing event by tracking the status at multiple data capture points in the ACH process. Accordingly, the system 100 can report an accurate status of each ACH file, batch, and item when requested by a customer. If a customer requests information for an ACH file, batch, or item, then the file tracking and reporting module 202 queries the record table 213 via the search module 213 to retrieve the status information. Then, the file tracking and reporting module 202 communicates the status information to the customer via the Internet 108.

The system 100 also can search for and identify ACH items based on a type of ACH transaction. The sending customer 102 creates an ACH item of a specific type of ACH transaction. The NACHA formatted item detail record of the ACH item and the batch header record of the associated ACH batch can include information that indicates the specific type of ACH transaction for the ACH item. In exemplary embodiments, the types of ACH transactions can comprise a return, a dishonored return, a contested dishonored return, an international return, a notification of change, and a refused notification of change.

The ACH operator 106 processes the ACH item of the specific type for acceptance. In that regard, the processing module 214 of the mainframe computer 112 processes the ACH file comprising the ACH batch for acceptance, processes the ACH batch comprising the ACH item of the specific type for acceptance, and processes the ACH item of the specific type for acceptance.

After accepting the ACH item of the specific type, the processing module 214 posts the accepted ACH item for settlement at the next settlement time. At the next settlement time, the processing module 214 debits and credits the appropriate accounts to settle the ACH item.

Then, the processing module 214 stores the accepted ACH item of the specific type in the file database 216 and associates the ACH item of the specific type with the parties to the ACH payment transaction detailed by the ACH item. In an exemplary embodiment, the processing module 214 can associate parties with the ACH item by indexing the parties' routing numbers or other identification numbers to the stored ACH item in the file database 216. In exemplary embodiments, the parties to the ACH transaction can comprise the sending customer 102 and the receiving customer 114.

Next, the processing module 214 associates in the file database 216 the specific type of ACH transaction with the ACH item. In an exemplary embodiment, the processing module 214 can associate the specific transaction type with the ACH item by indexing the transaction type to the ACH item stored in the file database 216. In another exemplary embodiment, the processing module 214 can associate the transaction type with the ACH item by storing the NACHA formatted item detail record, or a portion of that record, with the ACH item stored in the file database 216.

The steps described above can be repeated as needed to build the contents of the file database 216. In that case, the file database 216 can comprise multiple ACH items, each associated with its involved parties and specific ACH transaction type.

The search module 218 of the mainframe computer 112 receives a request from one of the parties to the ACH item transaction to provide information regarding ACH items of a specified type. In an exemplary embodiment, the party that created the ACH item of the specific type is the customer that communicates the request. In another exemplary embodiment, any party to the transaction can communicate such a request for information regarding ACH items of a specified type. The request can comprise criteria to identify the ACH items of the specified type. For example, the request can comprise criteria to identify all of the requesting customer's ACH items that match one or more of the transaction types. For instance, the request criteria can seek all types of items associated with the requesting customer. Alternatively, the request criteria can seek only one of the types of items, or any combination of the types of items, associated with the requesting customer. The request criteria also can comprise a date range for the items. In exemplary embodiments, the date range can comprise a specified date range, a processing date, a settlement date, or other suitable time period.

The search module 218 searches the file database 216 for the requesting customer's ACH items of the specified type by identifying stored ACH items associated with the requesting customer and associated with the specified type of ACH transaction. Then, the search module 218 communicates information regarding the identified ACH items to the operator server 110, which presents the information regarding the identified ACH items to the requesting customer via the Internet 108. In an exemplary embodiment, the information for the ACH items presented to the requesting customer can comprise a reference number, processing date, trace number, settlement date, company name, individual account holder name, individual account holder number, an indication of whether the item is an ACH debit or credit payment, and/or an amount of the item. The information also can comprise a summary total that indicates a total amount of all items that match the criteria specified in the search request.

Accordingly, the system 100 can allow a requesting customer to receive information regarding specified types of ACH items. By limiting the searching capabilities of the requesting customer, the system 100 can provide a meaningful set of search results to the requesting customer. The meaningful set of search results can comprise only those ACH items of the specified type.

Figure 3:
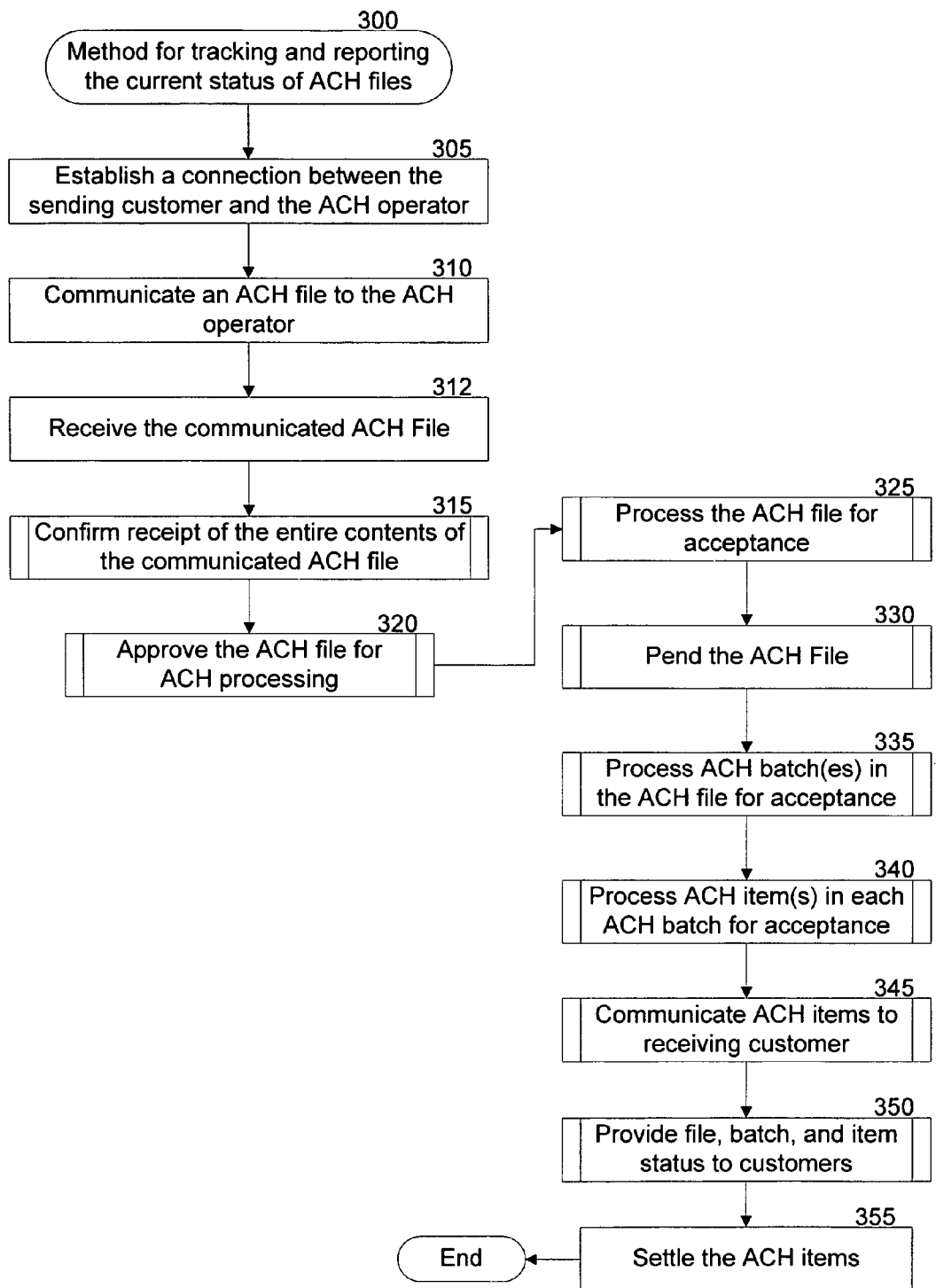
FIG. 3 is a flowchart depicting a method for tracking and reporting the status of automated clearing house transactions processed by an ACH operator according to an exemplary embodiment of the present invention.

FIG. 3 is a flowchart depicting a method 300 for tracking and reporting the status of automated clearing house transactions processed by an ACH operator 106 according to an exemplary embodiment of the present invention. The method 300 will be described with reference to FIGS. 1-3. As shown in step 305 of FIG. 3, the sending customer 102 establishes a secure connection with the ACH operator 106. For example, the sending customer 102 accesses the sending customer client computer 104 to log on to the operator server 110 via the Internet 108. After the operator server 110 verifies the credentials of the sending customer 102, the operator server 110 establishes the secure connection with the sending customer client computer 104 of the sending customer 102.

In step 310, the sending customer 102 communicates an ACH file from the sending customer client computer 104 to the operator server 110 via the Internet 108. The ACH file comprises at least one ACH batch that comprises at least one ACH transaction item. In step 312, the operator server 110 receives the ACH file communicated from the sending customer client computer 104. Then, in step 315, the operator server 110 confirms receipt of the entire contents of the communicated ACH file. Step 315 will be discussed subsequently in further detail with reference to FIG. 4.

In step 320, the sending customer 102 approves the ACH file for ACH processing. Step 320 will be discussed subsequently in further detail with reference to FIG. 5.

Then, in step 325, the mainframe computer 112 processes the ACH file for acceptance. Step 325 will be discussed subsequently in further detail with reference to FIG. 6.

In step 330, the mainframe computer 312 conditionally pends the ACH file in response to certain conditions. Step 330 will be discussed subsequently in further detail with reference to FIG. 7. In exemplary embodiments, the conditions that will pend processing of an ACH file comprise (1) when the immediate origin, file date, id and creation time are equal to a previously accepted file, and (2) when the current file contains exactly the same debit and credit dollar amounts as found in a previously processed file. Other conditions that pend processing of an ACH file are within the scope of the present invention.

In step 335, the mainframe computer 112 processes the ACH batches in the ACH file for acceptance. Step 335 will be discussed subsequently in more detail with reference to FIG. 8.

In step 340, the mainframe computer 112 processes the ACH items in each ACH batch for acceptance. Step 340 will be discussed subsequently in further detail with reference to FIG. 9.

In step 345, the ACH operator 106 communicates the ACH items to the receiving customer 114. Step 345 will be discussed subsequently in further detail with reference to FIG. 10.

In step 350, the ACH operator 106 provides file, batch, and item status to the sending and receiving customers 102, 114. Step 350 will be discussed subsequently in further detail with reference to FIG. 11.

From step 350, the method proceeds to step 355 in which the ACH operator 106 settles the ACH items by crediting and debiting the appropriate accounts.

Figure 4:
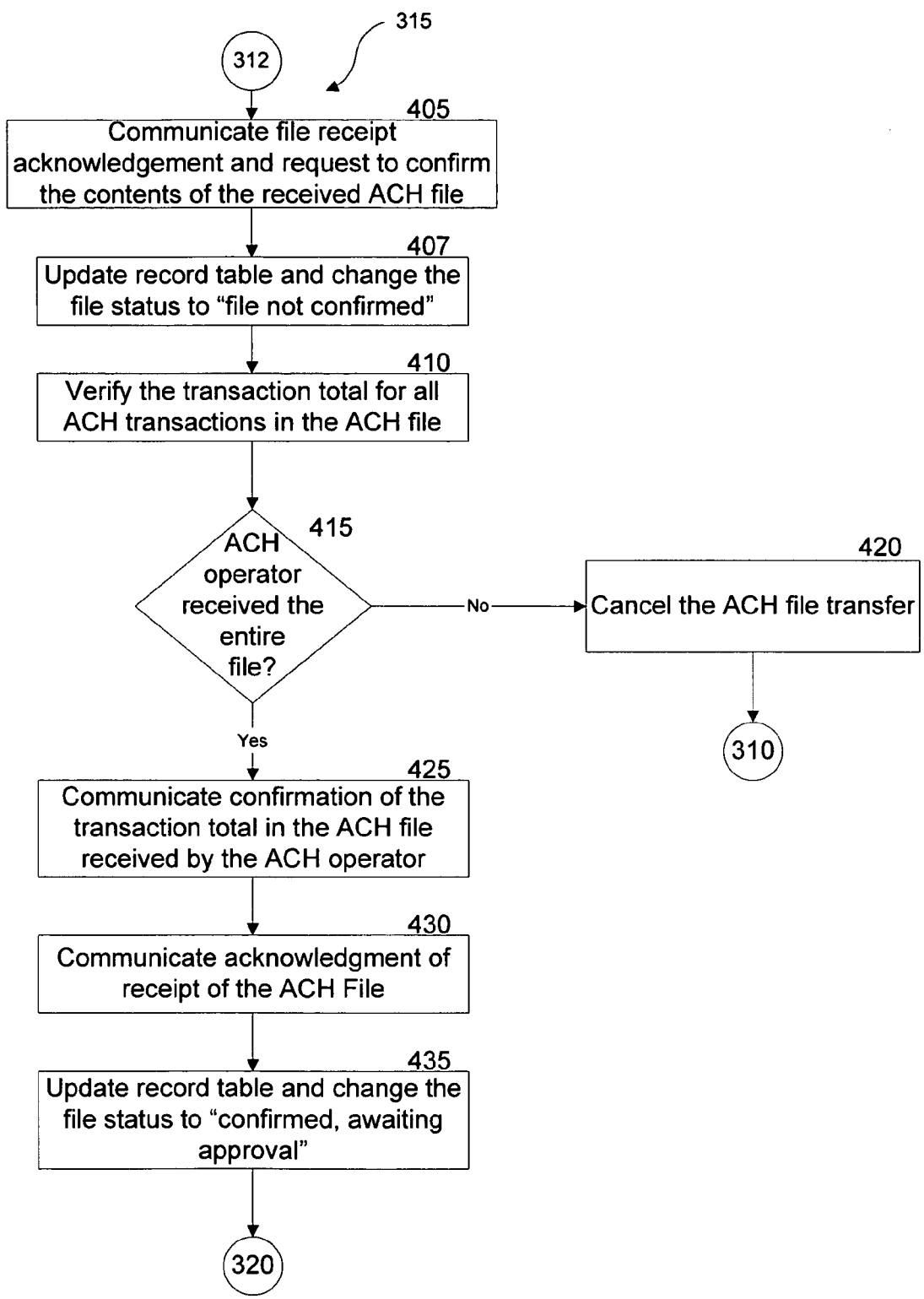
FIG. 4 is a flowchart depicting a method for confirming receipt of the entire contents of a communicated ACH file according to an exemplary embodiment of the present invention.

FIG. 4 is a flowchart depicting a method 315 for confirming receipt of the entire contents of a communicated ACH file according to an exemplary embodiment of the present invention, as referred to in step 315 of FIG. 3. The method 315 will be described with reference to FIGS. 1, 2, and 4.

In step 405, the operator server 110 communicates a file receipt acknowledgment to the sending customer client computer 104. The operator server 110 also communicates to the sending customer client computer 104 a request for the sending customer 102 to confirm the contents of the received ACH file. The file receipt acknowledgment comprises a summary total of the credit and debit ACH transaction items in the received ACH file. Accordingly, the operator server 110 requests the sending customer 102 to confirm the debit and credit totals of the received ACH file.

In step 407, the file tracking module 202 updates the record table 213 in the mainframe computer 112 and changes the file status to "file not confirmed." To update the record table, the file tracking module 202 records identifying information for the received ACH file and records the time and date of receipt of the ACH file. Identifying information can comprise the identification of the sending customer 102, the identification of the originator responsible for ACH batches and ACH items within the ACH file, the file creation date, file creation time, file id modifier, total batches, totals items, total debit dollars, and total credit dollars.

In step 410, the sending customer 102 verifies the transaction total for all ACH transactions in the ACH file. To confirm the transaction total, the sending customer 102 can compare the debit and credit totals from the ACH file that it communicated to the operator server 110 with the credit and debit totals from the confirmation request received from the operator server 110.

In step 415, the sending customer 102 determines whether the ACH operator 106 received the entire ACH file. In an exemplary embodiment, the sending customer 102 can determine whether the ACH operator 106 received the entire ACH file by determining whether the credit and debit totals from the communicated file match the credit and debit totals from the confirmation request. If the sending customer 102 determines in step 415 that the ACH operator 106 did not receive the entire ACH file, then the method 315 branches to step 420. In step 420, the sending customer 102 cancels the ACH file transfer. The method 315 then proceeds to step 310 (FIG. 3) in which the sending customer 102 can communicate the ACH file to the ACH operator 106 again.

Referring back to step 415, if the sending customer 102 determines that the ACH operator 106 received the entire ACH file, then the method 315 branches to step 425. In step 425, the sending customer 102 communicates confirmation of the credit and debit transaction totals in the ACH file received by the ACH file operator. In that regard, the sending customer 102 can communicate confirmation from the sending customer client computer 104 to the operator server 110 via the Internet 108.

In step 430, the operator server 110 communicates an acknowledgment that it received the entire ACH file to the sending customer client computer 104 via the Internet 108. Then, in step 435, the file tracking module 202 updates the record table 213 by changing the file status to "confirmed, awaiting approval." The file tracking module 202 also records the date and time of the file status change. The method 315 then proceeds to step 320 (FIG. 3).

Figure 5:
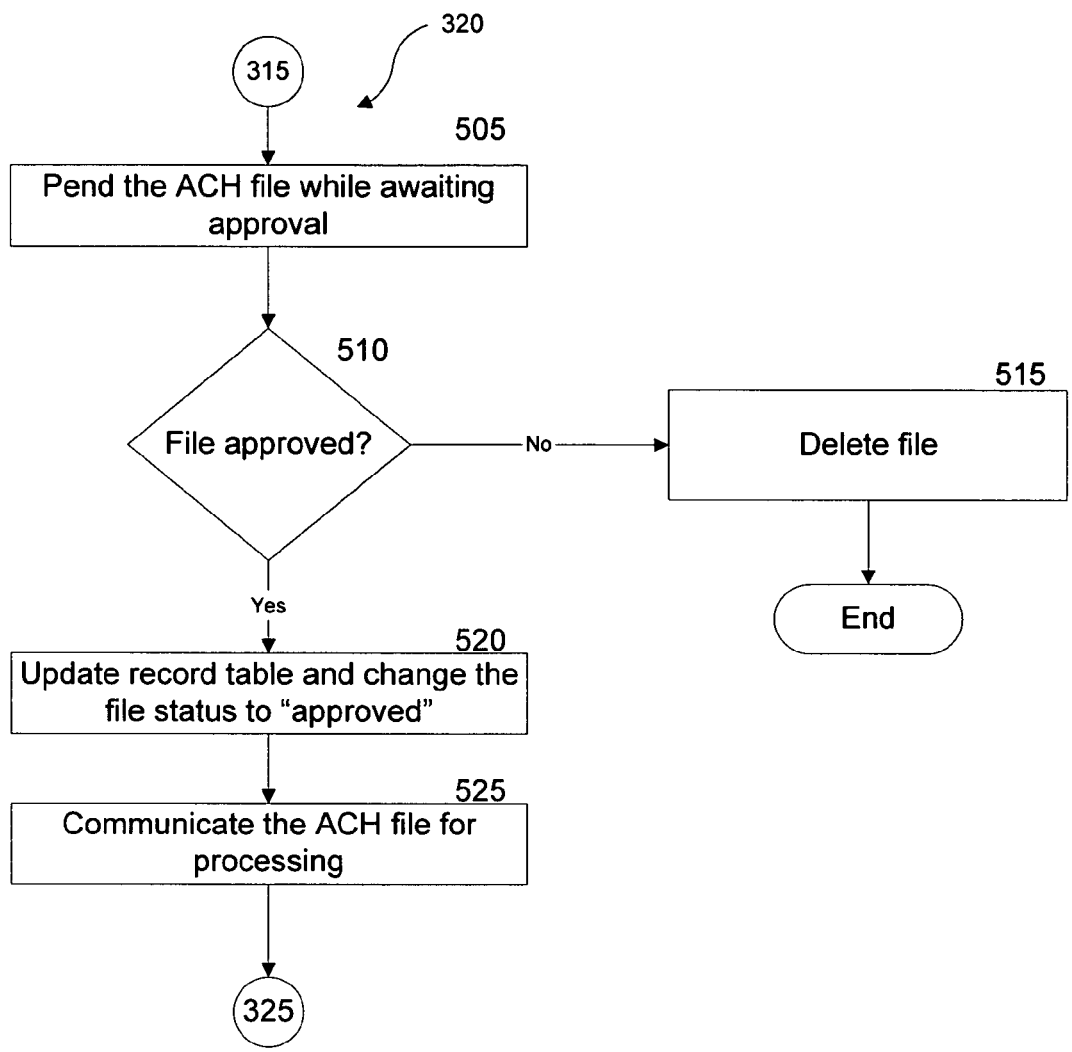
FIG. 5 is a flowchart depicting a method for approving an ACH file for ACH processing according to an exemplary embodiment of the present invention.

FIG. 5 is a flowchart depicting a method 320 for approving the ACH file for ACH processing according to an exemplary embodiment of the present invention, as referred to in step 320 of FIG. 3. The method 320 will be described with reference to FIGS. 1, 2, and 5.

As illustrated in step 505 of FIG. 5, the operator server 110 pends the ACH file while awaiting approval of the ACH file from the sending customer 102. In step 510, the method 320 determines whether the sending customer 102 has approved the file. In an exemplary embodiment, the sending customer 102 can approve the ACH file by communicating an approval message from the sending customer client computer 104 to the operator server 110 via the Internet 108. Typically, the approving employee is not the same employee that communicated and/or confirmed the ACH file to the ACH operator 106. Accordingly, the system provides dual control of the ACH transactions to increase security of those transactions.

The approving employee uses the sending customer client computer 104 to access the operator server 110 via the Internet 108, views the ACH file awaiting approval, and either approves or rejects the pended ACH file. To approve or reject the pended ACH file, the approving employee can communicate an approval or rejection message, respectively, from the sending customer client computer 104 to the operator server 110 via the Internet 108.

If the operator server 110 determines in step 510 that the sending customer 102 has approved the ACH file, then the method 320 branches to step 520. In step 520, the file tracking module 202 updates the record table 213 and changes the file status to "approved." The file tracking module 202 also records the date and time of the file status change in the record table 213. Then, in step 525, the operator server 110 communicates the approved ACH file to the file database 216 of the mainframe computer 112 for processing. The method 320 then proceeds to step 325 (FIG. 3).

Referring back to step 510, if the operator server 110 determines that the sending customer 102 has not approved the ACH file, then the method 320 branches to step 515. In an exemplary embodiment, the operator server 110 can determine that the sending customer 102 did not approve the ACH file upon receipt of a rejection message communicated from the sending customer 102. In an alternative exemplary embodiment, the operator server 110 can determine that the sending customer 102 has not approved the ACH file by detecting the passage of a predetermined amount of time. In step 515, the operator server 110 deletes the ACH file, and the file tracking module 202 updates the record table 213 to indicate that the sending customer 102 did not approve the ACH file.

Figure 6:
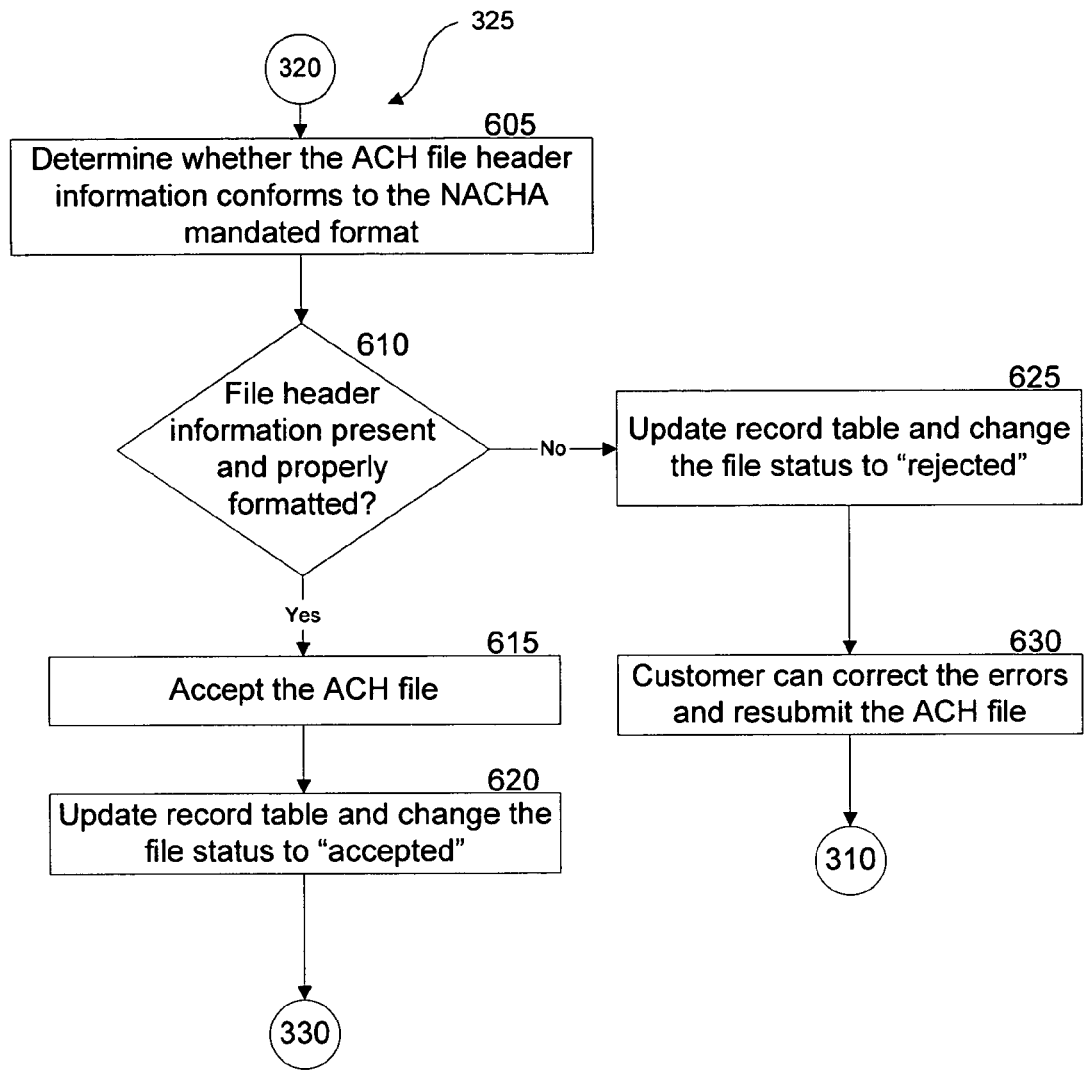
FIG. 6 is a flowchart depicting a method for processing an ACH file for acceptance according to an exemplary embodiment of the present invention.

FIG. 6 is a flowchart depicting a method 325 for processing an ACH file for acceptance according to an exemplary embodiment of the present invention, as referred to in step 325 of FIG. 3. The method 325 will be described with reference to FIGS. 1, 2, and 6.

In step 605 of FIG. 6, the processing module 214 of the mainframe computer 112 determines whether the ACH file header information conforms to the NACHA mandated format. The NACHA mandated format requires that the header information comprise specific information in a specific order and format. Accordingly, the processing module 214 compares the ACH file header information to the required NACHA information. Then, in step 610, the processing module 214 determines whether all required file header information is present and properly formatted. If yes, then the method 325 branches to step 615. In step 615, the processing module 214 accepts the ACH file. Then, in step 620, the processing module 214 updates the record table 213 and changes the file status to "accepted." The processing module 214 also records the date and time of the file status change. The method 325 then proceeds to step 330 (FIG. 3).

Referring back to step 610, if the processing module 214 determines that all required file header information is not present and/or properly formatted, then the method 325 branches to step 625. In step 625, the processing module 214 updates the record table 213 and changes the file status to "rejected." The processing module 214 also records the date and time of the file status change.

The method 325 then proceeds to step 630. In step 630, the sending customer 102 can correct the errors in the file header information and can resubmit the file. If the sending customer 102 decides to take that action, then the method 325 proceeds to step 310 (FIG. 3), in which the sending customer 102 can resubmit the corrected ACH file.

Figure 7:
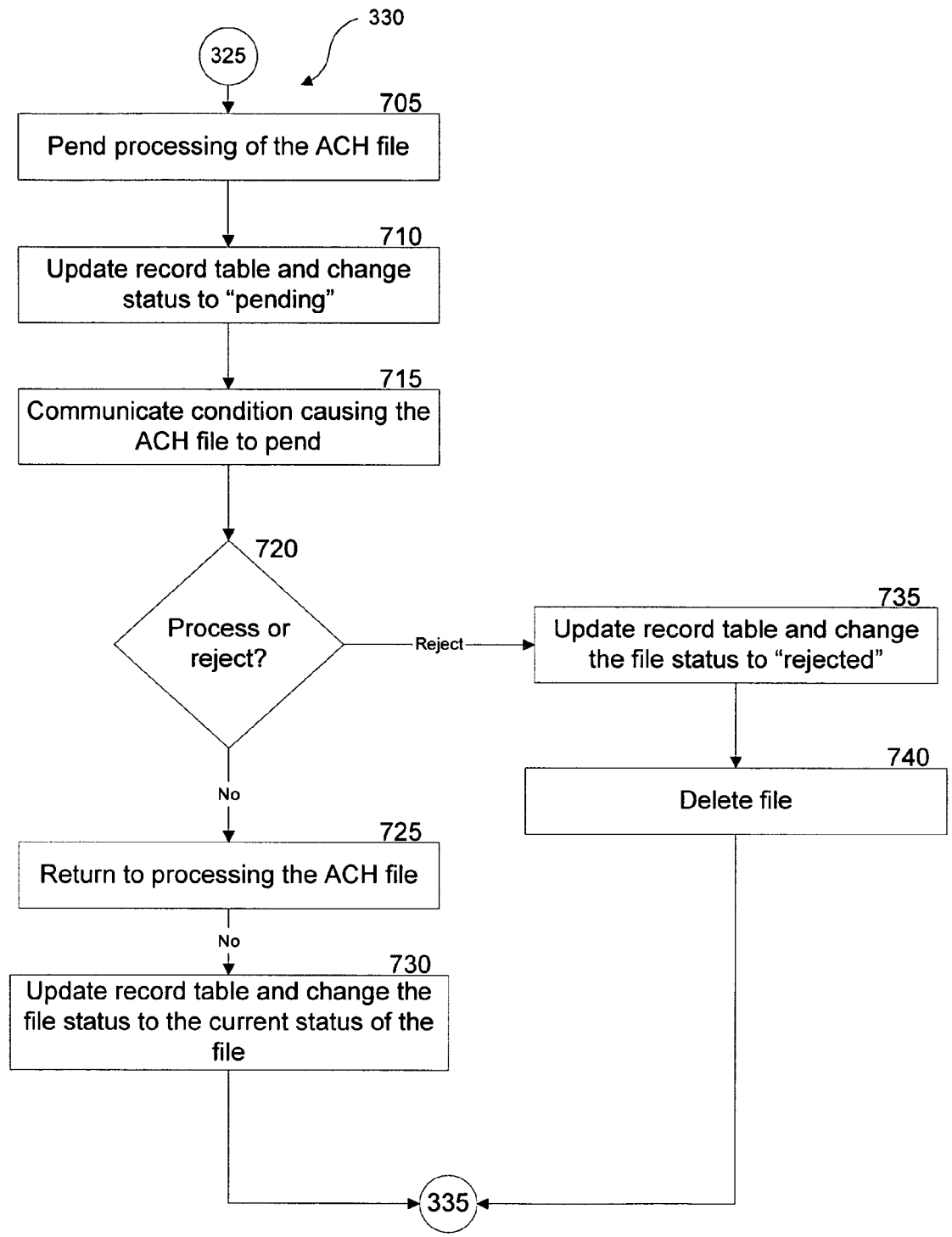
FIG. 7 is a flowchart depicting a method for suspending processing of an ACH file according to an exemplary embodiment of the present invention.

FIG. 7 is a flowchart depicting a method 330 for pending an ACH file according to an exemplary embodiment of the present invention, as referred to in step 330 of FIG. 3. The method 330 will be described with reference to FIGS. 1, 2, and 7.

In step 705, the processing module 214 conditionally pends processing of the ACH file. In an exemplary embodiment, the processing module 214 pends processing of the ACH file based on one of the following conditions: (1) when the immediate origin, file date, id and creation time are equal to a previously accepted file, and (2) when the current file contains exactly the same debit and credit dollar amounts as found in a previously processed file. Other conditions that cause the processing module 214 to pend processing of an ACH file are within the scope of the present invention.

In step 710, the processing module 214 updates the record table 213 and changes the file status to "pending." The processing module 214 also records the date and time of the file status change.

In step 715, the ACH operator 106 communicates the condition causing the file to pend to the sending customer 102. In exemplary embodiment, the ACH operator 106 can contact the sending customer 102 via telephone, e-mail, or other method to obtain the sending customer's instructions for processing or rejecting the pended ACH file.

In step 720, the processing module 214 determines whether the sending customer 102 instructed the ACH operator 106 to process or reject the pended ACH file. If the sending customer 102 instructs the ACH operator 106 to process the pended ACH file, then the method 330 branches to step 725. In step 725, the processing module 214 returns to processing the ACH file. Then, in step 730, the processing module 214 updates the record table and changes the file status to the status existing before the processing module 214 pended the ACH file. The processing module 214 also records the date and time of the file status change. The method 330 then proceeds to step 335 (FIG. 3).

Referring back to step 720, if the sending customer 102 instructs the ACH operator 106 to reject the pended ACH file, then the method 330 branches to step 735. In step 735, the processing module 214 updates the record table and changes the file status to "rejected." The processing module 214 also records the date and time of the file status change. In step 740, the processing module 214 deletes the ACH file. The method 330 then proceeds to step 335 (FIG. 3).

The ACH file can be pended at various points during processing. Accordingly, the method 330 can be performed at various points during the method 300 other than the specific location illustrated in FIG. 3. For example, the processing module 214 can detect a condition for pending the ACH file during the file processing step 325 (FIG. 3). In that case, the processing module 214 can suspend the file processing step 325 and perform the method 330. Typically, the ACH file is not pended. In that case, the method 300 can skip the method 330 entirely.

Figure 8:
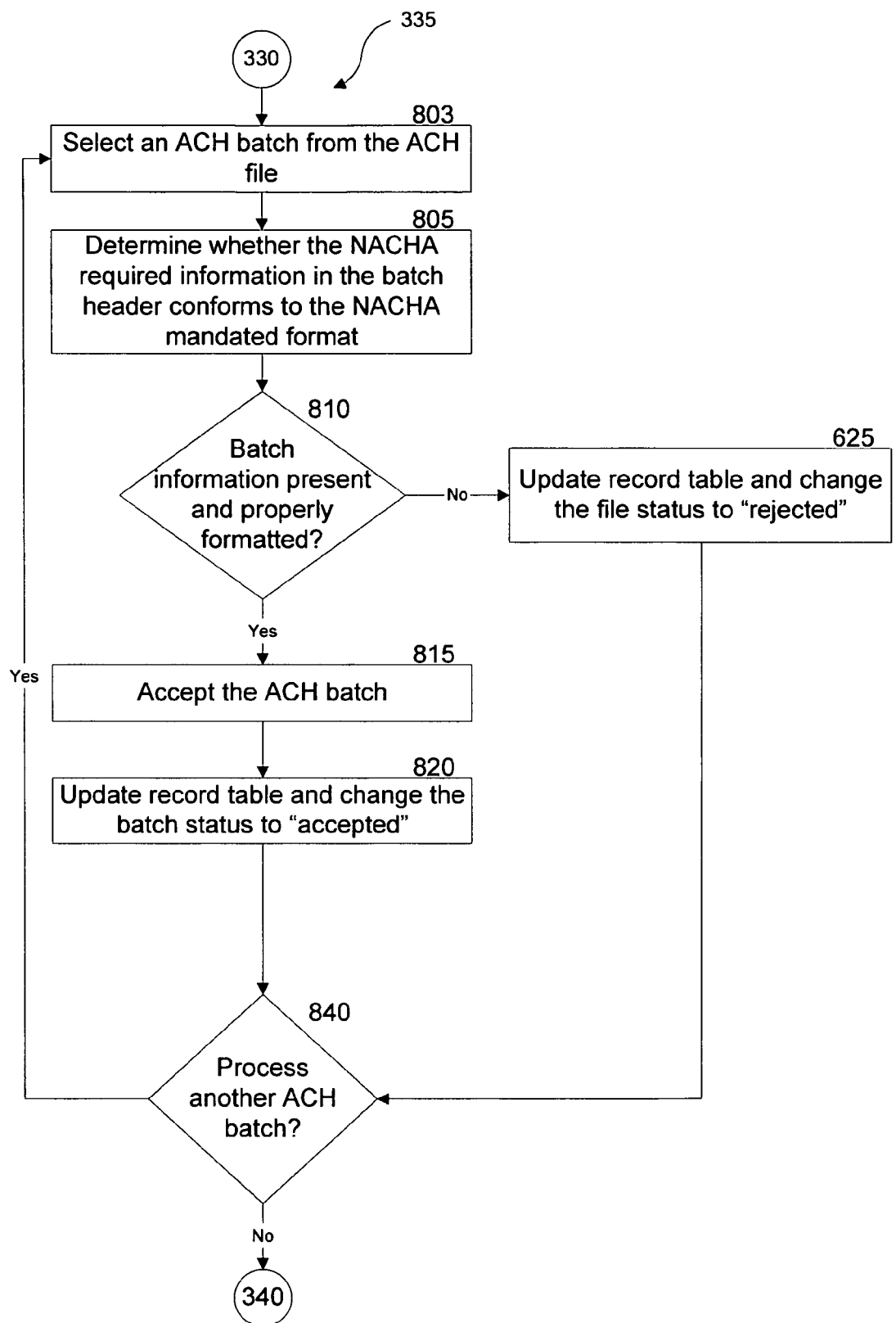
FIG. 8 is a flowchart depicting a method for processing ACH batches in an ACH file for acceptance according to an exemplary embodiment of the present invention.

FIG. 8 is a flowchart depicting a method 335 for processing ACH batches in an ACH file for acceptance according to an exemplary embodiment of the present invention, as referred to in step 335 of FIG. 3. The method 335 will be described with reference to FIGS. 1, 2, and 8.

In step 803 of FIG. 8, the processing module 214 selects an ACH batch from the ACH file. In step 805 of FIG. 8, the processing module 214 of the mainframe computer 112 determines whether the ACH batch header information conforms to the NACHA mandated format. The NACHA mandated format requires that the header information comprise specific information in a specific order and format. Accordingly, the processing module 214 compares the ACH batch header information to the required NACHA information. Then, in step 810, the processing module 214 determines whether all required batch header information is present and properly formatted. If yes, then the method 335 branches to step 815. In step 815, the processing module 214 accepts the ACH batch. Then, in step 820, the processing module 214 updates the record table 213 and changes the batch status to "accepted." The processing module 214 also records the date and time of the batch status change. The method 335 then proceeds to step 840, discussed subsequently.

Referring back to step 810, if the processing module 214 determines that all required batch header information is not present and/or properly formatted, then the method 335 branches to step 825. In step 825, the processing module 214 updates the record table 213 and changes the batch status to "rejected." The processing module 214 also records the date and time of the batch status change. The sending customer 102 can correct the errors in the batch header information and can resubmit the batch in a new ACH file. If the sending customer 102 decides to take that action, then the sending customer 102 can resubmit the corrected batch in a new file in step 310 (FIG. 3).

From step 825, the method 335 proceeds to step 840. In step 840, the processing module 214 determines whether to process another ACH batch from the ACH file. If another ACH batch exists in the ACH file, then the method 335 branches back to step 803 to process another ACH batch from the ACH file. If the processing module 214 determines in step 840 that another ACH batch does not exist in the ACH file, then the method 335 branches to step 340 (FIG. 3).

Figure 9:
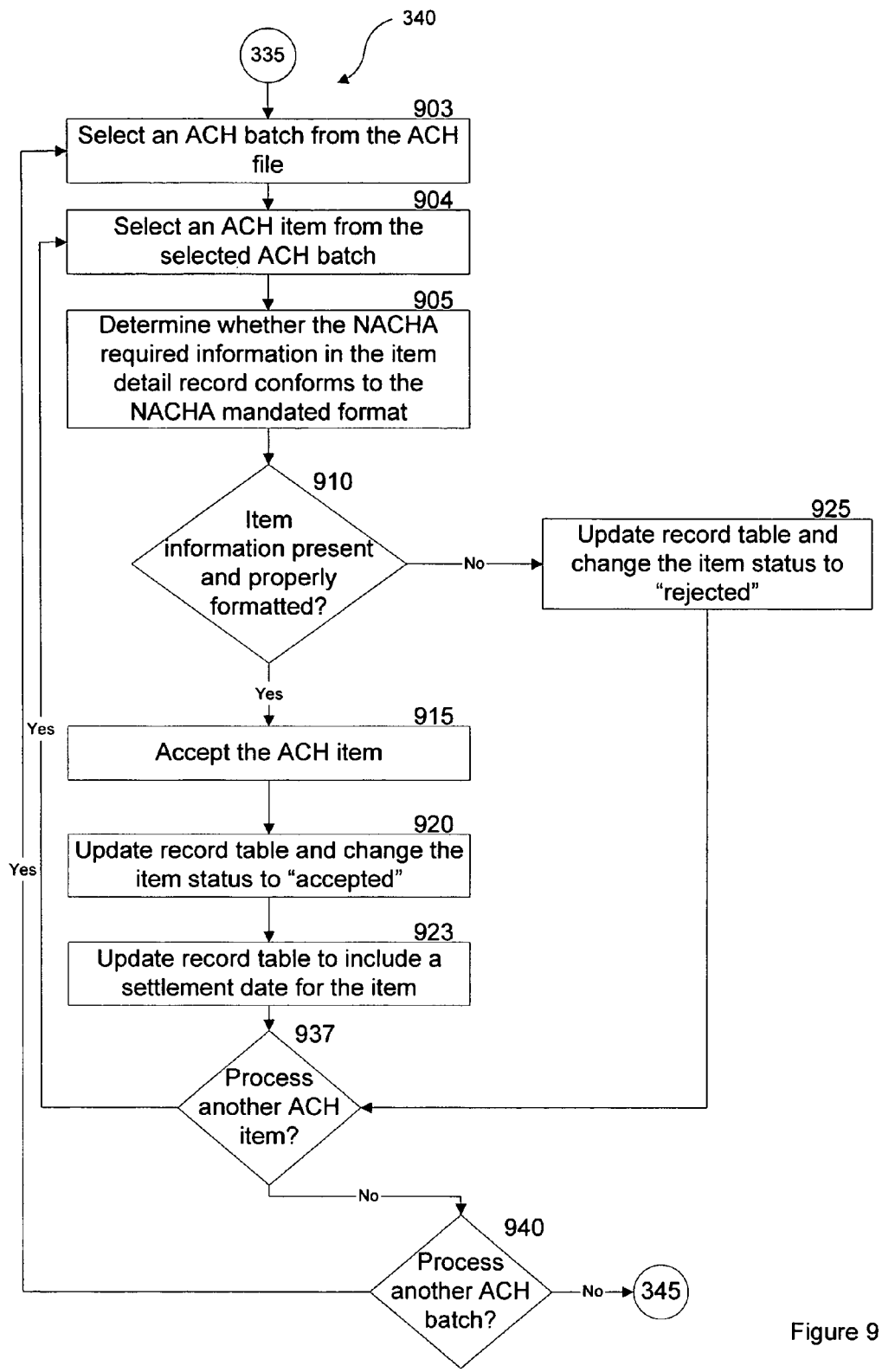
FIG. 9 is a flowchart depicting a method for processing ACH items and each ACH batch for acceptance according to an exemplary embodiment of the present invention.

FIG. 9 is a flowchart depicting a method 340 for processing ACH items and each ACH batch for acceptance according to an exemplary embodiment of the present invention, as referred to in step 340 of FIG. 3. The method 340 will be described with reference to FIGS. 1, 2, and 9.

In step 903 of FIG. 9, the processing module 214 selects an ACH batch from the ACH file. In step 904, the processing module 214 selects an ACH item from the selected ACH batch.

Then, in step 905, the processing module 214 determines whether the ACH item detail record information conforms to the NACHA mandated format. The NACHA mandated format requires that the item detail record information comprise specific information in a specific order and format. Accordingly, the processing module 214 compares the ACH item detail record information to the required NACHA information. Then, in step 910, the processing module 214 determines whether all required item detail record information is present and properly formatted. If yes, then the method 340 branches to step 915. In step 915, the processing module 214 accepts the ACH item. Then, in step 920, the processing module 214 updates the record table 213 and changes the item status to "accepted." The processing module 214 also records the date and time of the item status change. The method 340 then proceeds to step 937, discussed subsequently.

Referring back to step 910, if the processing module 214 determines that all required item detail record information is not present and/or properly formatted, then the method 340 branches to step 925. In step 925, the processing module 214 updates the record table 213 and changes the item status to "rejected." The processing module 214 also records the date and time of the item status change. The sending customer 102 can correct the errors in the item detail record information and can resubmit the corrected item in a new ACH batch and file. If the sending customer 102 decides to take that action, then the sending customer 102 resubmits the corrected item in a new file in step 310 (FIG. 3).

From step 925, the method 340 proceeds to step 937. In step 937, the processing module 214 determines whether to process another item from the selected ACH batch. If another item remains to be processed in the selected ACH batch, then the method 340 branches back to step 904 to process another ACH item from the selected ACH batch. If all ACH items from the selected ACH batch have been processed, then the method 340 branches to step 940.

In step 940, the processing module 214 determines whether to process ACH items from another ACH batch in the ACH file. If another ACH batch exists in the ACH file, then the method 340 branches back to step 903 to process another ACH batch from the ACH file. If the processing module 214 determines in step 940 that another ACH batch does not exist in the ACH file, then the method 340 branches to step 340 (FIG. 3).

Figure 10:
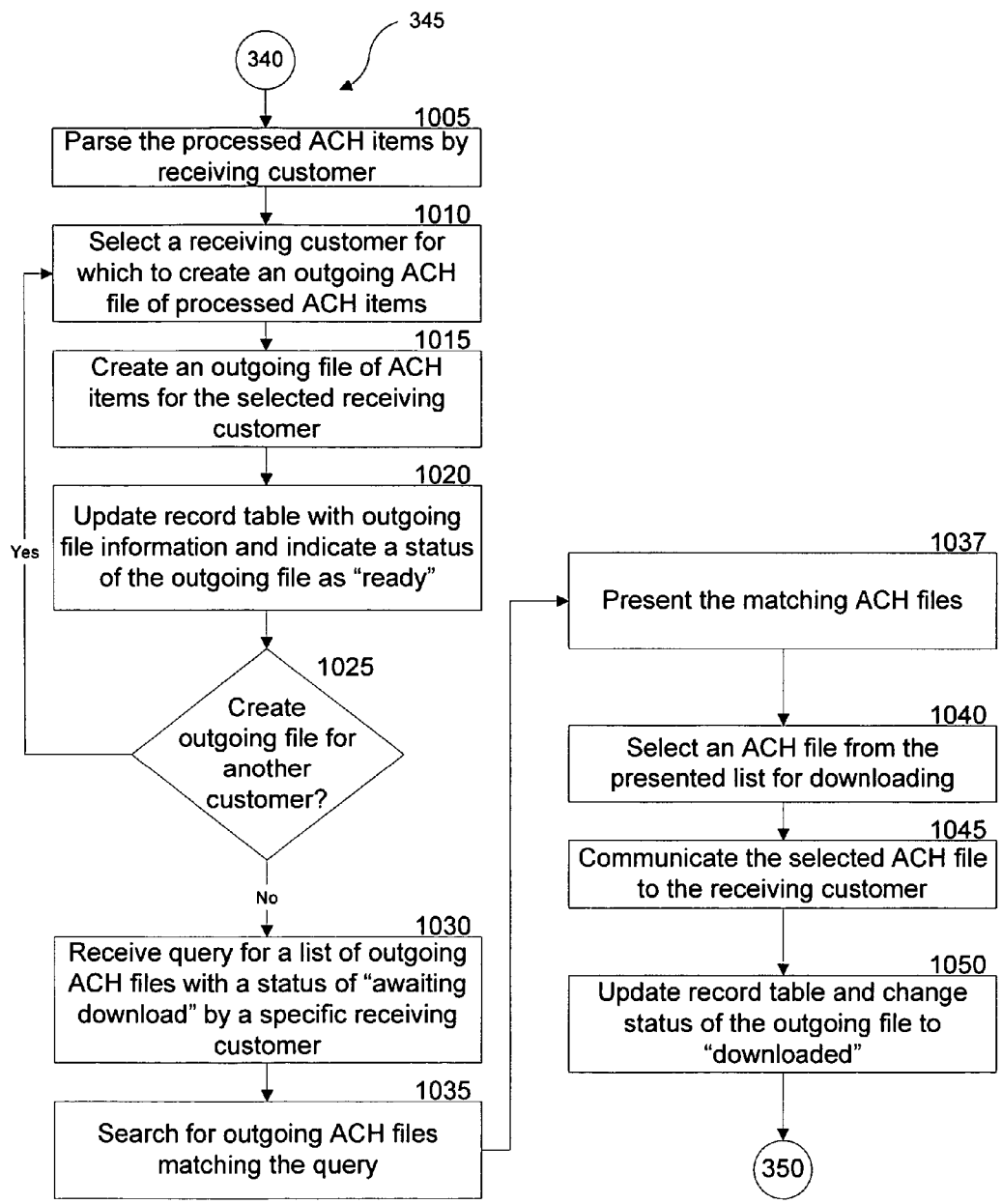
FIG. 10 is a flowchart depicting a method for communicating ACH items to a receiving customer according to an exemplary embodiment of the present invention.

FIG. 10 is a flowchart depicting a method 345 for communicating ACH items to a receiving customer 114 according to an exemplary embodiment of the present invention, as referred to in step 345 of FIG. 3. The method 345 will be described with reference to FIGS. 1, 2, and 10.

In step 1005 of FIG. 10, the processing module 214 parses the processed ACH items by receiving customer. For example, the processing module 214 can sort processed ACH items into groups of items for each receiving customer 114. Then, in step 1010, the processing module 214 selects a specific receiving customer 114 for which to create an outgoing ACH file of processed ACH items. In step 1015, the processing module 214 creates an outgoing file of ACH items for the selected receiving customer 114. In an exemplary embodiment, the processing module 214 creates the required ACH item detail record information for each of the ACH items for the receiving customer 114, creates a batch of the ACH items, creates the required ACH batch header information for the batch, creates an ACH file comprising the ACH batch, creates the required ACH file information for the created file, and stores the created file in the file database 216. Finally, in step 1020, the processing module 214 updates the record table 213 with identifying information for the outgoing file and records a status of the outgoing file as "ready."

In step 1025, the processing module 214 determines whether to create an outgoing file for another receiving customer 114. If yes, the method 345 branches back to step 1010 to create an outgoing file for another receiving customer 114. If the processing module 214 will not create an outgoing file for another receiving customer 114, then the method 345 branches to step 1030.

In step 1030, the operator server 110 receives a query from a specific receiving customer 114 for a list of the specific receiving customer's outgoing ACH files with a status of "ready." In step 1035, the operator server 110 communicates the query to the search module 218 of the mainframe computer 112, and the search module 218 searches the record table 213 for ACH files matching the query. Then, in step 1037, the search module 218 communicates a list of ACH files matching the query to the operator server 110 for presentation to the specific receiving customer 114 on the receiving customer client computer 116.

In step 1040, the receiving customer 114 selects an ACH file from the list presented on the receiving customer client computer 116 for downloading. In step 1045, the operator server 110 communicates the selected ACH file's information to the processing module 214. The processing module 214 retrieves the selected ACH file from the file database 216 and communicates the selected ACH file to the operator server 110, which communicates the selected ACH file to the receiving customer client computer 116 via the Internet 108.

In step 1050, the processing module 214 updates the record table 213 and changes the status of the outgoing file to "downloaded." The processing module 214 also records in the record table 213 the time and date of the file status change. The method 345 then proceeds to step 350 (FIG. 3).

Figure 11:
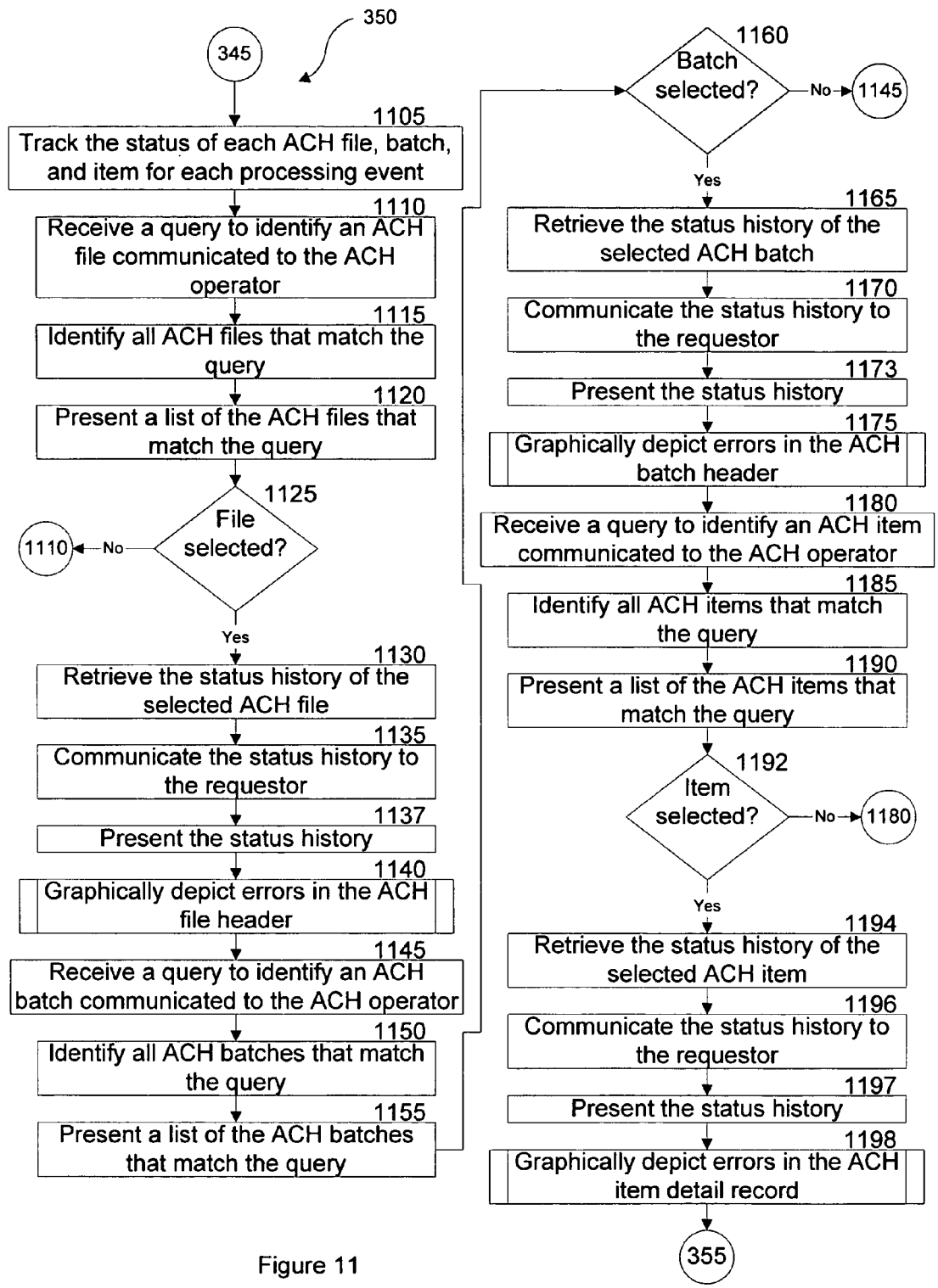
FIG. 11 is a flowchart depicting a method for providing ACH file, batch, and item status to customers according to an exemplary embodiment of the present invention.

FIG. 11 is a flowchart depicting a method 350 for providing ACH file, batch, and item status to customers according to an exemplary embodiment of the present invention, as referred to in step 350 of FIG. 3. The method 350 will be described with reference to FIGS. 1, 2, and 11.

In step 1105, the ACH operator 106 tracks the status of each ACH file, batch, and item for each processing event. In an exemplary embodiment, the ACH operator 106 tracks the status as discussed previously with reference to FIGS. 3-10. Accordingly, by tracking the status of each ACH file, batch, and item for each processing event, the record table 213 comprises identifying information for each ACH file, batch, and item, as well as the date and time of each status change associated with each processing event. For example, the processing events can comprise receiving the ACH file, confirming the ACH file, approving the ACH file, pending the ACH file, processing the ACH file, processing each ACH batch in the ACH file, and processing each ACH item in each ACH batch. In an exemplary embodiment, the status associated with the ACH processing events can comprise file not confirmed; confirmed, awaiting approval; approved; rejected; accepted; pending; ready; and downloaded. The present invention is not limited to those processing events or status discussed above. Additionally, each status is not limited to the exact terms used to describe the status. Other terms can be used to describe the status of the ACH transactions. For example, a file that is "ready" can have a status of "created" or "awaiting download."

In step 1110, the file tracking module 202 receives a query from the sending customer client computer 104 to obtain the status of an ACH file communicated to the ACH operator 106. In an exemplary embodiment, the query can comprise one or more of a transaction amount, transaction date, sending customer 102 routing number, receiving customer 114 routing number, or other identifying information. The file tracking module 202 communicates the query to the search module 218 of the mainframe computer 112. Then, in step 1115, the search module 218 searches the record table 213, identifies all ACH files that match the query, and returns a list of the matching ACH files to the file tracking module 202. In step 1120, the file tracking module 202 communicates the list of matching ACH files to the sending customer client computer 104 for presentation to the sending customer 102.

In step 1125, the file tracking module 202 determines whether the receiving customer 102 has selected one of the matching ACH files from the presented list. If the sending customer 102 does not select one of the matching ACH files, then the method 350 branches back to step 1110 in which the sending customer 102 can communicate another query to the file tracking module 202. If the sending customer 102 selects one of the matching ACH files, then the method 350 branches to step 1130. In step 1130, the file tracking module 202 communicates the identification information of the selected ACH file to the processing module 214, and the processing module 214 retrieves the status history of the selected ACH file from the record table 213.

In step 1135, the processing module 214 communicates the status history to the file tracking module 202, which communicates the status history to the sending customer client computer 104 via the Internet 108. Then, in step 1137, the sending customer client computer 104 presents the status history of the selected ACH file to the sending customer 102.

In an exemplary embodiment, the status history can comprise only a current status of the selected ACH file. In an alternative exemplary embodiment, the status history can comprise the current status of the selected ACH file, as well as information indicating prior status changes of the selected ACH file.

In step 1140, an error presentation module 204 graphically depicts errors in the file header of the selected ACH file on the sending customer client computer 104. Graphically depicting the errors in the ACH file header can allow the sending customer 102 to easily identify and correct the file header errors. Step 1140 will be discussed subsequently in more detail with reference to FIG. 12.

In step 1145, the file tracking module 202 receives a query from the sending customer client computer 104 to obtain the status of an ACH batch communicated to the ACH operator 106. In an exemplary embodiment, the query can comprise one or more of a transaction amount, transaction date, sending customer 102 routing number, receiving customer 114 routing number, or other identifying information. The file tracking module 202 communicates the query to the search module 218 of the mainframe computer 112. Then, in step 1150, the search module 218 searches the record table 213, identifies all ACH batches that match the query, and returns a list of the matching ACH batches to the file tracking module 202. In step 1155, the file tracking module 202 communicates the list of matching ACH batches to the sending customer client computer 104 for presentation to the sending customer 102.

In step 1160, the file tracking module 202 determines whether the receiving customer 102 has selected one of the matching ACH batches from the presented list. If the sending customer 102 does not select one of the matching ACH batches, then the method 350 branches back to step 1145 in which the sending customer 102 can communicate another query to the operator server 110. If the sending customer 102 selects one of the matching ACH batches, then the method 350 branches to step 1165. In step 1165, the file tracking module 202 communicates the identification information of the selected ACH batch to the processing module 214, and the processing module 214 retrieves the status history of the selected ACH batch from the record table 213.

In step 1170, the processing module 214 communicates the status history to the file tracking module 202, which communicates the status history to the sending customer client computer 104 via the Internet 108. Then, in step 1173, the sending customer client computer 104 presents the status history of the selected ACH batch to the sending customer 102.

In an exemplary embodiment, the status history can comprise only a current status of the selected ACH batch. In an alternative exemplary embodiment, the status history can comprise the current status of the selected ACH batch, as well as information indicating prior status changes of the selected ACH batch.

In step 1175, the error presentation module 204 graphically depicts errors in the batch header of the selected ACH batch on the sending customer client computer 104. Graphically depicting the errors in the ACH batch header can allow the sending customer 102 to easily identify and correct the batch header errors. Step 1175 will be discussed subsequently in more detail with reference to FIG. 12.

In step 1180, the file tracking module 202 receives a query from the sending customer client computer 104 to obtain the status of an ACH item communicated to the ACH operator 106. In an exemplary embodiment, the query can comprise one or more of a transaction amount, transaction date, sending customer 102 routing number, receiving customer 114 routing number, trace number, or other identifying information. The file tracking module 202 communicates the query to the search module 218 of the mainframe computer 112. Then, in step 1185, the search module 218 searches the record table 213, identifies all ACH items that match the query, and returns a list of the matching ACH items to the file tracking module 202. In step 1190, the file tracking module 202 communicates the list of matching ACH items to the sending customer client computer 104 for presentation to the sending customer 102.

In step 1192, the file tracking module 202 determines whether the receiving customer 102 has selected one of the matching ACH items from the presented list. If the sending customer 102 does not select one of the matching ACH items, then the method 350 branches back to step 1180 in which the sending customer 102 can communicate another query to the file tracking module 202. If the sending customer 102 selects one of the matching ACH items, then the method 350 branches to step 1194. In step 1194, the file tracking module 202 communicates the identification information of the selected ACH item to the processing module 214, and the processing module 214 retrieves the status history of the selected ACH item from the record table 213.

In step 1196, the processing module 214 communicates the status history to the file tracking module 202, which communicates the status history to the sending customer client computer 104 via the Internet 108. Then, in step 1197, the sending customer client computer 104 presents the status history of the selected ACH item to the sending customer 102.

In an exemplary embodiment, the status history can comprise only a current status of the selected ACH item. In an alternative exemplary embodiment, the status history can comprise the current status of the selected ACH item, as well as information indicating prior status changes of the selected ACH item.

In step 1198, an error presentation module 204 graphically depicts errors in the item detail record of the selected ACH item on the sending customer client computer 104. Graphically depicting the errors in the ACH item detail record can allow the sending customer 102 to easily identify and correct the item detail record errors. Step 1198 will be discussed subsequently in more detail with reference to FIG. 12. From step 1198, the method 350 proceeds to step 355 (FIG. 3).

The customer can access the method 350 from various points. For example, the customer can begin the method 350 by entering a query for an ACH file. Alternatively, the customer can begin the method 350 be entering a query for an ACH batch or an ACH item. In that case, then the file tracking module 202 skips to the appropriate step in the method 350 to begin searching for the ACH batch or ACH file.

Although discussed herein with reference to the sending customer 102, the receiving customer 114 and other customers also can query the operator server 110 for status of ACH batches, batches, and items for which the receiving customer 114 is a party. The process followed by the receiving customer 114 and other customers to obtain status of its ACH batches, batches, and items is similar to the process followed by the sending customer 102. In an exemplary embodiment, other customers can comprise an originator that is responsible for ACH batches and items communicated to the ACH operator 106 by the sending customer 102.

Figure 12:
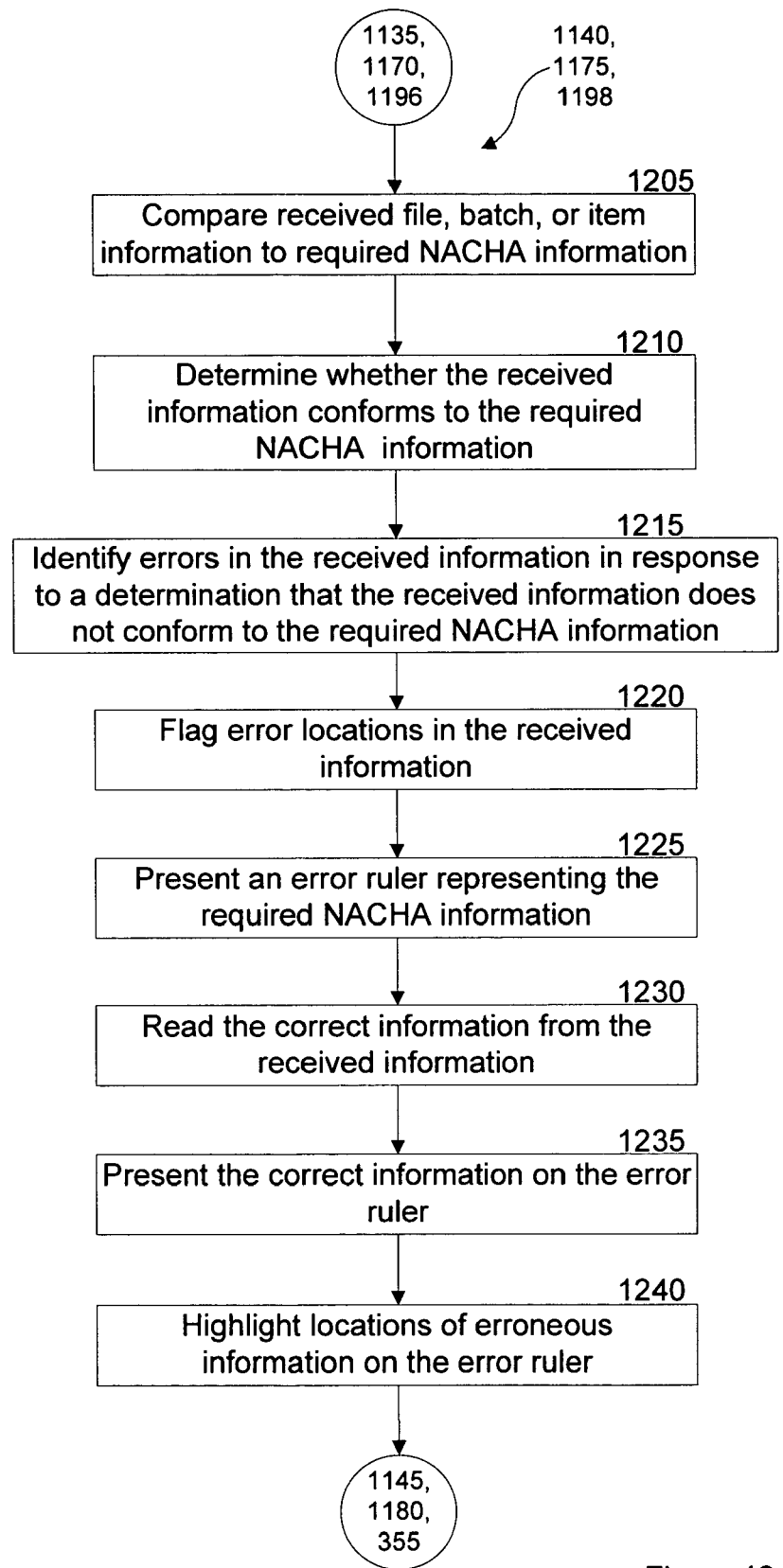
FIG. 12 is a flowchart depicting a method for graphically depicting errors in ACH header information according to an exemplary embodiment of the present invention.
Figure 17:
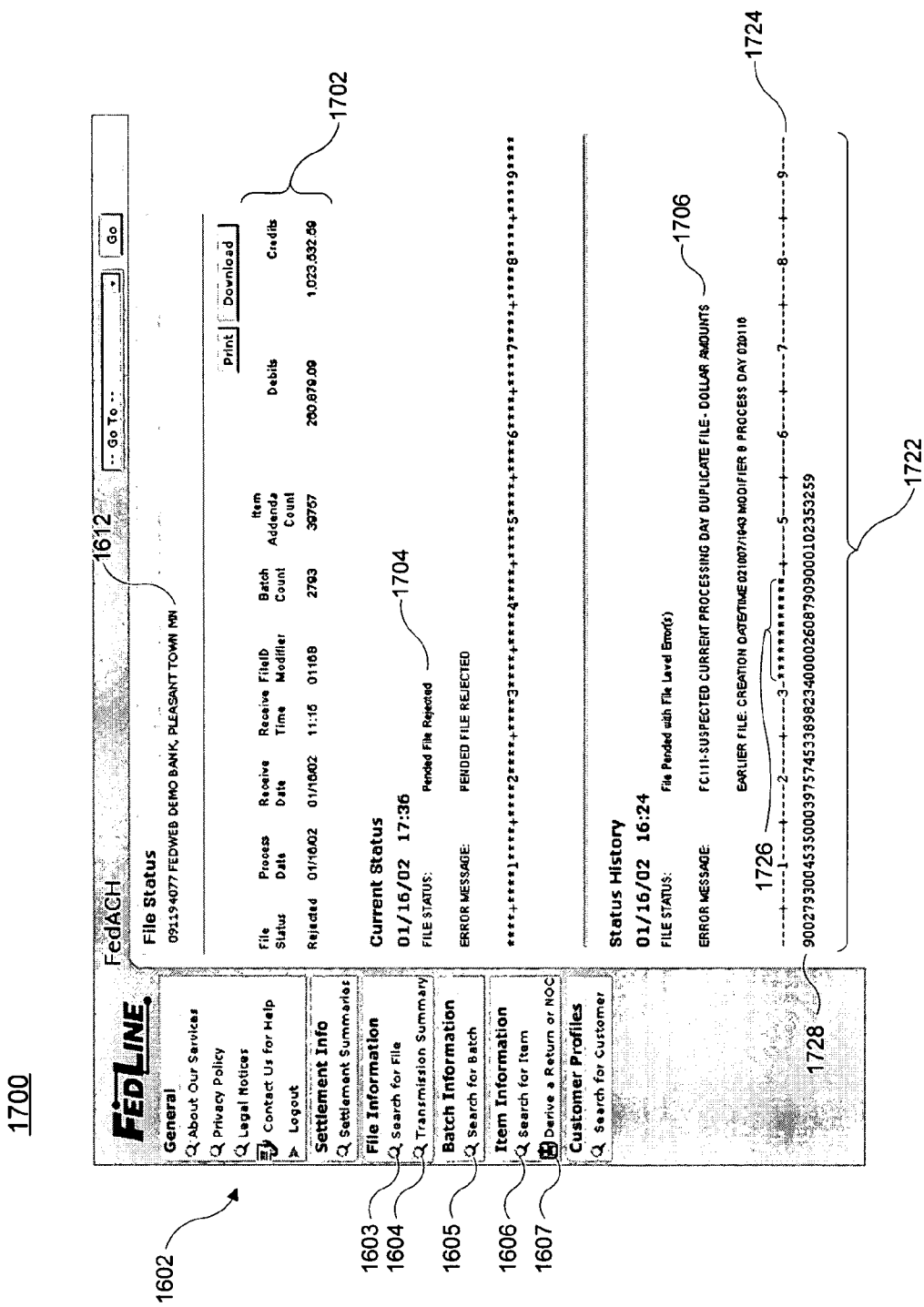
FIG. 17 illustrates a file status user interface for presenting the status of an ACH file according to an exemplary embodiment of the present invention.

FIG. 12 is a flowchart depicting a method for graphically depicting errors in ACH file, batch, and item information according to an exemplary embodiment of the present invention, as referred to in steps 1140, 1175, and 1198 of FIG. 11. The methods 1140, 1175, and 1198 will be discussed with reference to FIGS. 1, 2, 12, and 17. FIG. 17 illustrates a file status user interface 1700 for graphically depicting ACH file status according to an exemplary embodiment of the present invention.

In step 1205, the processing module 214 compares the received file, batch, and item information to required NACHA information. For example, when processing an ACH file, the processing module 214 compares the ACH file header information to required NACHA file header information. Alternatively, when processing an ACH batch, the processing module 214 compares ACH batch header information to required NACHA batch header information. Additionally, when processing an ACH item, the processing module 214 compares the item detail record information to required NACHA item detail record information.

In step 1210, the processing module 214 determines whether the received information conforms to the required NACHA information. In an exemplary embodiment, the processing module 214 makes that determination by determining whether all of the required information is present and properly formatted. If all of the required information is present and properly formatted, then the received information does not comprise any errors. However, if all of the required header information is not present and/or properly formatted, then the received information comprises errors. Accordingly, in step 1215, the processing module 214 identifies errors in the received information in response to a determination that the received information does not conform to the required NACHA information.

In step 1220, the processing module 214 flags error locations in the received information. In an exemplary embodiment, the processing module 214 can attach metadata to the ACH file, batch, or item being processed that indicates the location of the error within the received information.

In step 1225, an error presentation module 204 communicates an error ruler 1722 to the sending customer client computer 104 for presentation to the sending customer 102. The error ruler 1722 represents locations of the required NACHA information in the ACH file header, batch header, or item detail record. In an exemplary embodiment, the error ruler 1722 can comprise a continuous string of data locations 1724 representing the characters of required NACHA information. In the exemplary embodiment illustrated in FIG. 17, the error ruler 1722 comprises a continuous string of ninety-four data locations 1724 that each correspond to a required character of NACHA information. Each data location on the continuous string 1724 must include the required NACHA information in the proper format, or the processing module 214 will reject the associated file, batch, or item.

In step 1230, the error presentation module 204 reads the correct information 1728 from the ACH file header, batch header, or item detail record. Then, in step 1235, the error presentation module 204 presents the correct information 1728 on the error ruler 1722 in the appropriate locations corresponding to the proper locations in the required NACHA information. The error presentation module 204 communicates that information to the operator server 110 for presentation to the sending customer 102 on the sending customer client computer 104.

In step 1240, the error presentation module 204 highlights locations of erroneous information 1726 on the error ruler 1722 presented on the sending customer client computer 104. In an exemplary embodiment, the error presentation module 204 can read the flagged error locations and can highlight the corresponding locations 1726 on the error ruler 1722. The error locations 1726 can be highlighted by color, asterisks, or other suitable highlighting means. As illustrated in FIG. 17, an error exists for characters 32-43 of the NACHA information. Accordingly, the customer can review the NACHA regulations to determine the exact information required for characters 32-43. Then, the customer can provide accurate information for characters 32-43 to correct the error.

The method then proceeds to steps 1145 or 1180, or the method ends, depending on the starting point from which the method began.

The error ruler 1722 provides a graphical depiction of NACHA information errors in an ACH file, batch, or item to simplify identification and correction of those errors. NACHA specifies a required header and detail record format for providing ACH file, batch, and item information. If an error is determined during edit processing of a NACHA-formatted file, batch, or item, then the mainframe computer 112 will act according to a predefined set of rules (determined in advance by the customer) as to how to proceed with processing of file and/or batch(es) in error. For the ACH operator 106 to process the data in error, the customer must correct the error(s) and resubmit either 1) the entire file, or 2) the corrected batch or item encapsulated in a new NACHA-formatted file according to the customer's choice of edit rules (file-level or batch-level rejection when errors are found).

In addition, the error ruler 1722 can also identify conditions where consultation is required between the customer and ACH Operator before further processing of an ACH file can proceed. The information presented by the error ruler can be used by the customer to specifically identify the location of errors in their ACH file(s). Then, the customer can use their own ACH software to edit their original file correcting identified errors in file, batch, or item-related records. The customer can resubmit the corrected NACHA file or batch for ACH transaction processing.

Figure 13:
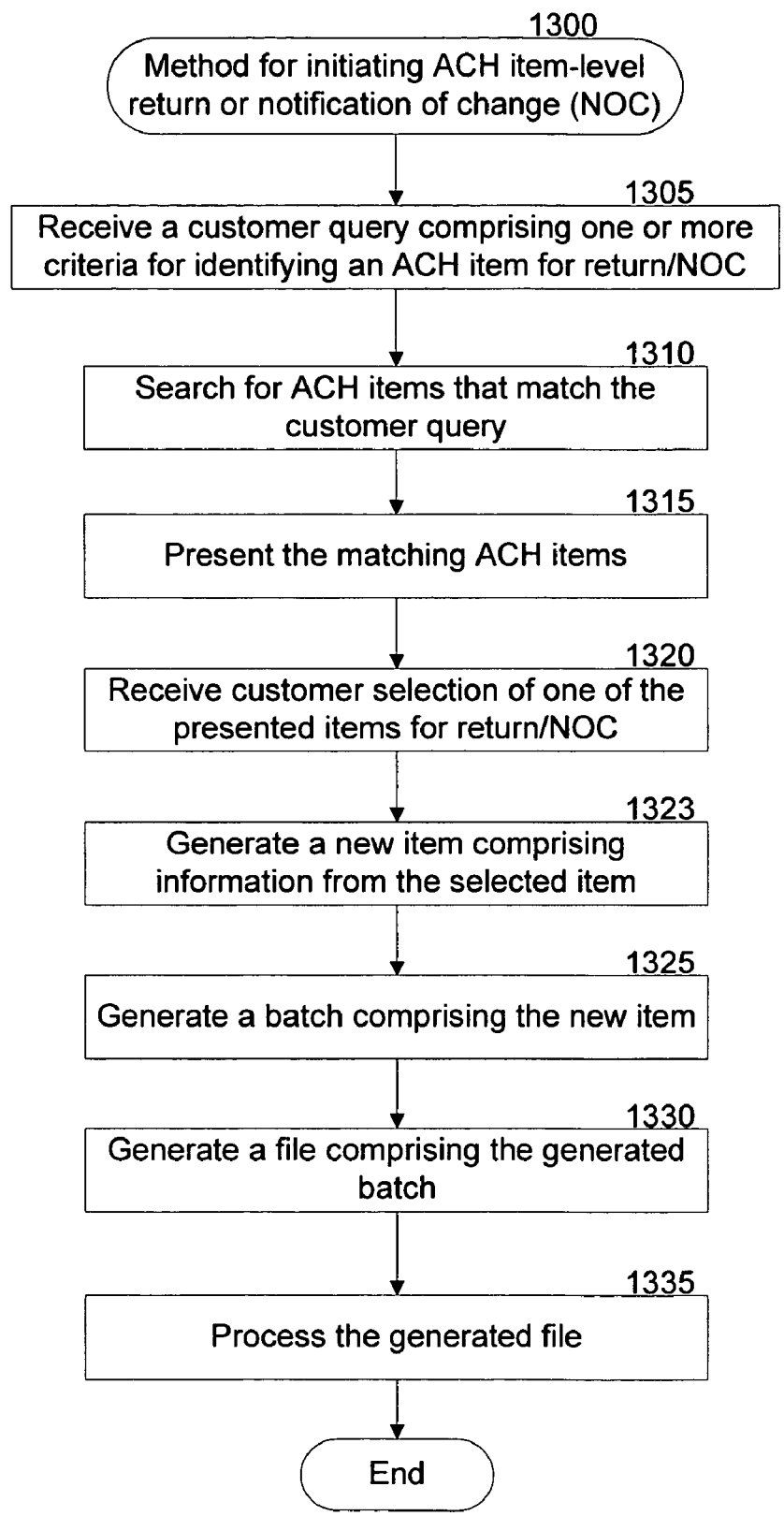
FIG. 13 is a flowchart depicting a method for initiating an ACH item-level return or an item notification of change ("NOC") according to an exemplary embodiment of the present invention.

FIG. 13 is a flowchart depicting a method 1300 for initiating an ACH item-level return or an item notification of change ("NOC") according to an exemplary embodiment of the present invention. The method 1300 will be described with reference to FIGS. 1, 2, and 13. In step 1305, a return/NOC module 206 of the operator server 110 receives a customer query via the Internet 108. The customer query comprises one or more criteria for identifying an ACH item in the file database 216 for return or NOC. For example, the search criteria can comprise dollar amount, trace number, company or individual name, process or settlement date, or other suitable criteria.

The return/NOC module 206 communicates the customer query to the search module 218. Then, in step 1310, the search module 218 searches the record table 213 for ACH items that match the customer query. The search module 218 communicates the matching ACH items to the return/NOC module 206, which communicates the matching ACH items to the sending customer client computer 104 via Internet 108. Then, in step 1315, the sending customer client computer 104 presents the matching ACH items to the sending customer 102.

The sending customer 102 selects one of the presented items for return/NOC and communicates the selection from the sending customer client computer 104 to the return/NOC module 206 of the operator server 110 via the Internet 108. In step 1320, the return/NOC module 206 receives the sending customer's item selection and communicates the customer's item selection to the processing module 214 of mainframe computer 112.

In step 1323, the processing module 214 generates a new ACH transaction item comprising information from the ACH item selected for return/NOC by the sending customer 102. Accordingly, the processing module 214 creates an item detail record comprising the required NACHA information and associates the ACH item information with the created detail. Accordingly, the customer "derived" the return/NOC item because processing module created the return/NOC item based on information stored in the mainframe computer 112. In other words, the processing module 214 automatically completes the item information based on information from the file database 216 and/or the record table 213.

In step 1325, the processing module 214 generates a new batch comprising the new item. In that regard, the processing module 214 creates a batch header comprising the required NACHA batch header information and associates the generated batch with the created batch header information.

In step 1330, the processing module 214 generates a file comprising the new batch. In that regard, the processing module 214 creates a file header comprising the required NACHA file header information and associates the generated file with the created file header.

Then, in step 1335, the processing module 214 processes the generated file as discussed above with reference to FIGS. 6, 8, and 9. In an exemplary embodiment, the processing module 214 also can return a reference number to the customer for future tracking of the derived return/NOC item. Additionally, the customer can search for derived items by using that criteria in a query of the mainframe computer 112.

According to the exemplary embodiment illustrated in FIG. 13, the sending customer 102 can communicate a query comprising multiple criteria for which the search module 218 can search for matching ACH items. In response, the search module 218 can identify multiple ACH items that match the customer query and can communicate those matching ACH items to the sending customer 102 via the sending customer client computer 104. The sending customer 102 can select one or multiple matching ACH items for return/NOC and can communicate the selection to the processing module 214 of the ACH operator 106. Then, the processing module 214 automatically generates the ACH batch comprising the selected ACH item. Periodically, the processing module 214 generates an ACH file by aggregating all generated batches into the ACH file. The processing module 214 then processes the generated file, batch(es), and item(s) to initiate the return or NOC of the selected ACH item(s).

Figure 14:
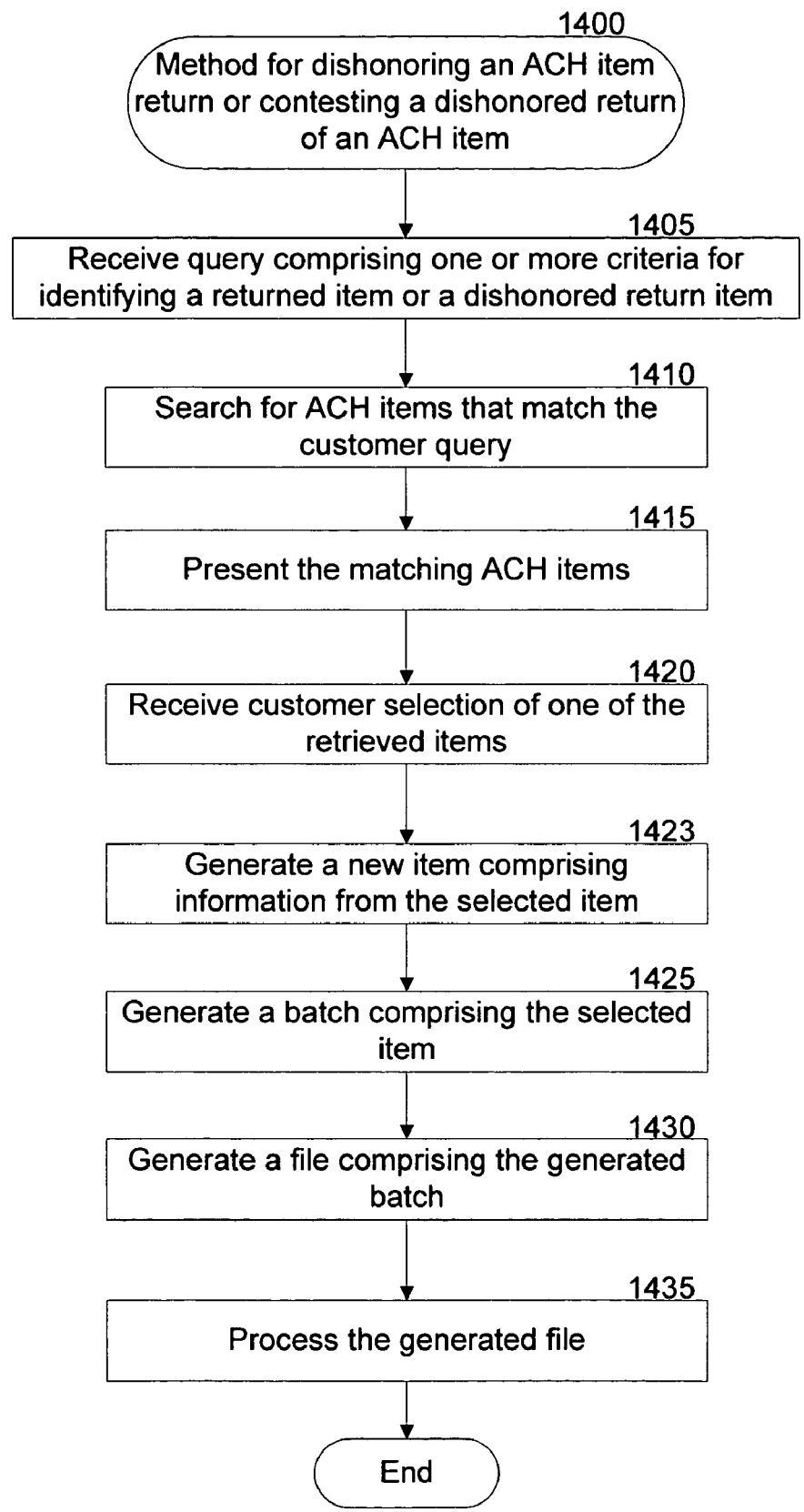
FIG. 14 is a flowchart depicting a method for dishonoring an ACH item return or contesting a dishonored return of an ACH item according to an exemplary embodiment of the present invention.

FIG. 14 is a flowchart depicting a method 1400 for dishonoring an ACH item return or contesting a dishonored return of an ACH item according to an exemplary embodiment of the present invention. The method 1400 will be described with reference to FIGS. 1, 2, and 14.

In step 1405, the return/NOC module 206 of the operator server 110 receives a query from the sending customer 120. The query comprises one or multiple criteria for identifying a returned item or a dishonored return item. The return/NOC module 206 communicates the query to the search module 218. In step 1410, the search module 218 searches the record table 213 for ACH items that match the customer query and communicates the matching ACH items to the return/NOC module 206. In step 1415, the return/NOC module 206 communicates the matching ACH items to the sending customer client computer 104 via the Internet 108 for presentation to the sending customer 102.

In step 1420, the return/NOC module 206 receives the sending customer's selection of one or more of the retrieved items. In that regard, the sending customer 102 can communicate the customer selection from the sending customer client computer 104 to the return/NOC module 206 of the operator server 110 via the Internet 108. The return/NOC module 206 then communicates the customer selection to the processing module 214 of the mainframe computer 112.

In step 1423, the processing module 214 generates a new ACH transaction item comprising information from the ACH item selected by the sending customer 102 for a dishonored return or a contested dishonored return. Accordingly, the processing module 214 creates an item detail record comprising the required NACHA information and associates the ACH item information with the created detail.

In step 1425, the processing module 214 generates a new batch comprising the new item. In that regard, the processing module 214 creates a batch header comprising the required NACHA batch header information and associates the generated batch with the created batch header information.

In step 1430, the processing module 214 generates a file comprising the new batch. In that regard, the processing module 214 creates a file header comprising the required NACHA file header information and associates the generated file with the created file header.

Then, in step 1435, the processing module 214 processes the generated file as discussed above with reference to FIGS. 6, 8, and 9.

According to the exemplary embodiment illustrated in FIG. 14, the sending customer 102 can communicate a query comprising multiple criteria for which the search module 218 can search for matching ACH items. In response, the search module 218 can identify multiple ACH items that match the customer query and can communicate those matching ACH items to the sending customer 102 via the sending customer client computer 104. The sending customer 102 can select one or multiple matching ACH items for dishonored return or contested dishonored return and can communicate the selection to the processing module 214 of the ACH operator 106. Then, the processing module 214 automatically generates the ACH batch comprising the selected ACH item. Periodically, the processing module 214 generates an ACH file by aggregating all generated batches into the ACH file. The processing module 214 then processes the generated file, batch(es), and item(s) to dishonor the returned item(s) or to contest dishonored return item(s).

Figure 15:
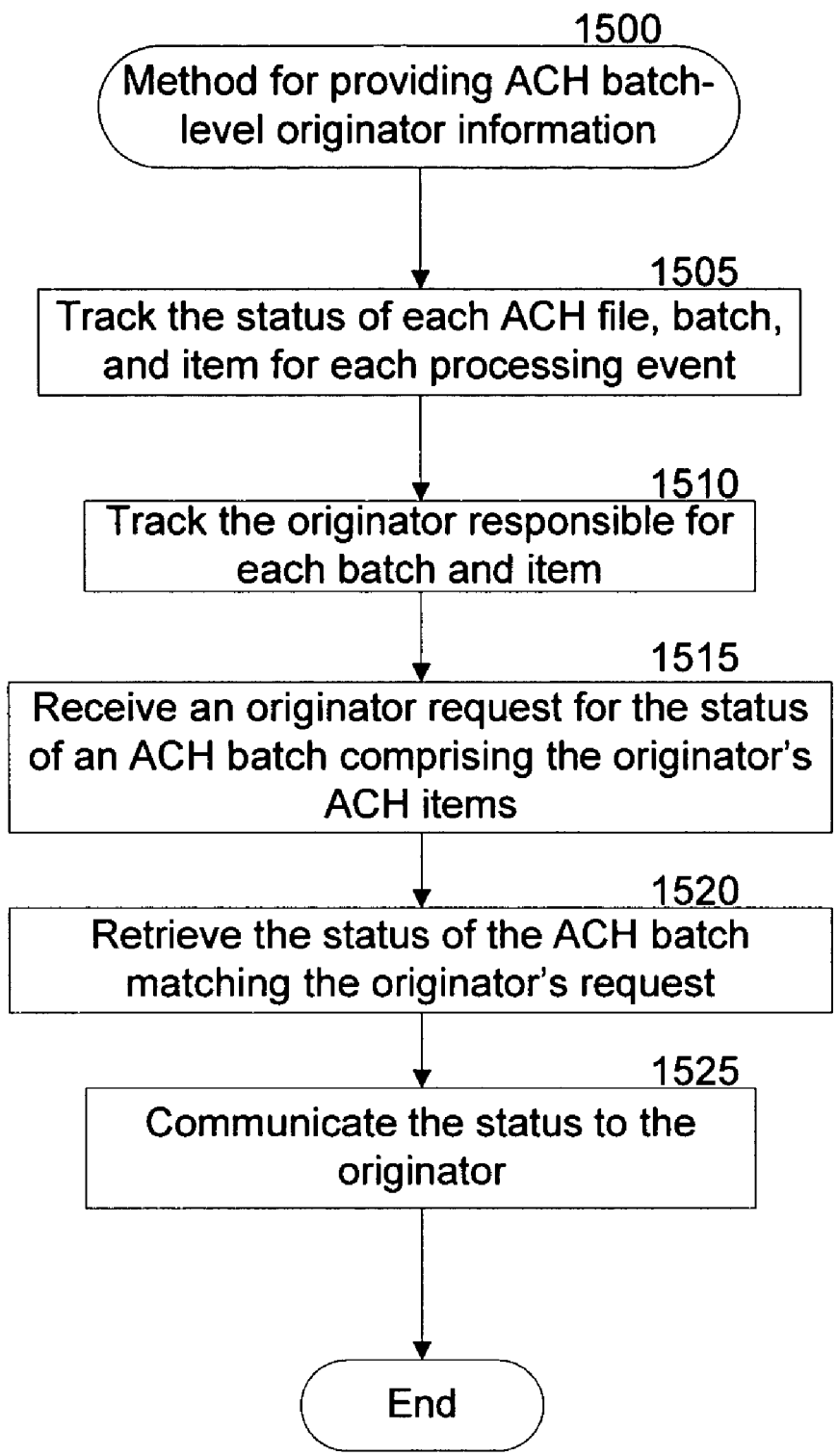
FIG. 15 is a flowchart depicting a method for providing ACH batch-level originator and receiver information according to an exemplary embodiment of the present invention.

FIG. 15 is a flowchart illustrating a method 1500 for providing ACH batch-level originator information according to an exemplary embodiment of the present invention. The method 1500 will be described with reference to FIGS. 1, 2, and 15. Some originators use a third party to process their ACH transactions. ACH files may comprise ACH batches and items for multiple originators, and each originator only has authority to review its own ACH transactions. Accordingly, originators and receivers using a third-party processor previously could not obtain batch status and settlement information, because they could not access data at the batch level. In the past, those originators could request data for only its own ACH items. Given their respective roles in the ACH transaction processing payments flow, originating depository financial institutions "ODFIs" and receiving depository financial institutions "RDFIs" have a business need to locate batches using batch-level originator information. Accordingly, the method 1500 can allow originators to search across multiple ACH files to obtain status information for ACH batches comprising its ACH items.

In step 1505, the ACH operator 106 tracks the status of each ACH file, batch, and item for each processing event. In an exemplary embodiment, the ACH operator 106 can track the status as discussed above with reference to FIGS. 3-10.

In step 1510, the ACH operator 106 also can track the originator responsible for each batch and each item. In an exemplary embodiment, multiple sending customers 102 can communicate multiple ACH files to the ACH operator 106. Each ACH file can comprise multiple ACH batches, and each ACH batch can comprise multiple ACH items. Each ACH batch can comprise ACH items for only a single originator. Accordingly, the file tracking module 202 can record in the record table 213 the originator responsible for each ACH batch.

In step 1515, the file tracking module 202 can receive a request from an originator for the status of an ACH batch comprising the originator's ACH items. In an exemplary embodiment, the originator can communicate a request for a specific ACH batch based on identifying information of the ACH batch. In an alternative exemplary embodiment, the originator can communicate a request for information on all ACH batches associated with the originator.

The file tracking module 202 communicates the originator request to the search module 218 of the mainframe computer 112. In step 1520, the search module 218 searches the record table 213 for ACH batches that match the originator request and retrieves the status of the ACH batches that match the originator's request. In step 1525, the search module 218 communicates the ACH batch information and status to the file tracking module 202, which communicates that information to the originator via the Internet 108.

Exemplary user interfaces for performing embodiments of the present invention will be described below with reference to FIGS. 16-27. FIG. 16 illustrates a file search user interface 1600 for allowing a customer to search for originated or received ACH files according to an exemplary embodiment of the present invention. As illustrated in FIG. 16, the file search user interface 1600 comprises a menu 1602 from which the customer can select a file tracking and reporting option. The menu 1602 comprises the following controls from which the user can select: a search for file control 1603, a transmission summary control 1604, a search for batch control 1605, a search for item control 1606, and a derive a return or NOC control 1607.

To view the exemplary file search user interface 1600, the customer selects the search for file control 1603. The file search user interface comprises a file search entry window 1610 in which the customer can input search criteria for identifying an ACH file. The file search entry window 1610 comprises a customer information field 1612, which the operator server 110 automatically can populate based on the login information provided by the customer. The customer can focus the search for originated or received files by selecting one of an originated or received radio button 1614. Additionally, the customer can enter a date range in the date fields 1616 to focus the file search. If known, the customer can enter an identification number of a particular file in the file ID field 1618.

After entering the information in the file search entry window 1610, the customer selects the view list button 1619 to display the file search results window 1620. The file search results window 1620 comprises a total file summary information window 1622 that provides a summary of the files meeting the search criteria. The file search results window 1620 also comprises an individual file summary information window 1624 that lists information about each individual file meeting the search criteria. The individual file summary information window 1624 comprises a file status 1626 for each individual file. Each file status 1626 comprises a link to a file status user interface presenting detailed status information for the respective file.

Additionally, the individual file summary information window 1624 comprises a batch count 1628 for each respective file. The batch count 1628 comprises a link through which the customer can view a user interface presenting information about the batches within the respective files.

FIG. 17 illustrates a file status user interface 1700 according to an exemplary embodiment of the present invention. By selecting one of the file status icons 1626 from the exemplary file search user interface 1600, the customer can link to the file status user interface 1700 to view the status of the selected file. For example, if the customer selects the file status icon 1626 for the rejected file listed in the individual file summary information window 1624, then the file status user interface 1700 can present the file status information illustrated in FIG. 17.

The file status user interface 1700 comprises identifying file information 1702 for the selected file. The file status user interface 1700 also comprises a current status 1704 of the selected file. In the exemplary embodiment illustrated in FIG. 17, the current status 1704 comprises "pended file rejected."

If header information of the selected ACH file includes any errors, then the file status user interface 1700 also can display an error ruler 1722 that graphically depicts the location of the error within the required file header information. In an exemplary embodiment, the error ruler 1722 can comprise a continuous string of data locations 1724 representing the characters of required NACHA information. In the exemplary embodiment illustrated in FIG. 17, the error ruler 1722 comprises a continuous string of ninety-four data locations 1724 that each correspond to a required character of NACHA information. Each data location on the continuous string 1724 must include the required NACHA information in the proper format, or the processing module 214 will reject the associated file, batch, or item.

The error ruler 1722 can present the correct header information 1728 on the error ruler 1722 in the appropriate locations corresponding to the proper locations in the required NACHA information. The error ruler 1722 also can comprise highlighted locations of erroneous header information 1726 on the error ruler 1722. The error locations 1726 can be highlighted by color, asterisks, or other suitable highlighting means. As illustrated in FIG. 17, an error exists for characters 32-43 of the NACHA information. Accordingly, the customer can review the NACHA regulations to determine the exact information required for characters 32-43. Then, the customer can provide accurate information for characters 32-43 to correct the error.

The file status user interface 1700 also can comprise an error message 1706 for presenting a reason code or description of the file errors depicted in the error ruler 1722.

Figure 18:
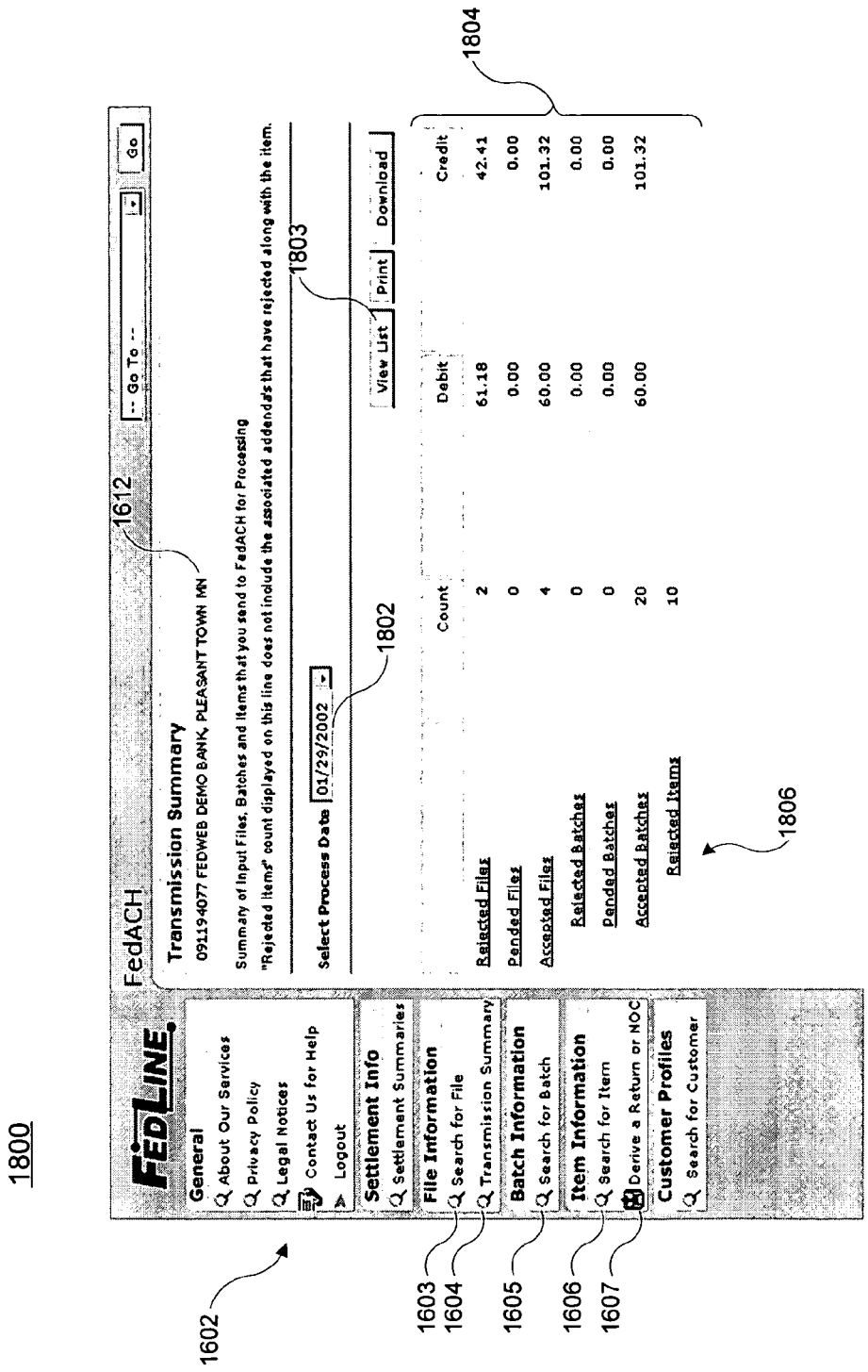
FIG. 18 illustrates a transmission summary user interface that presents information regarding ACH files, batches, and items transmitted to an ACH operator according to an exemplary embodiment of the present invention.

FIG. 18 illustrates a transmission summary user interface that presents information regarding ACH files, batches, and items transmitted to the ACH operator 106 according to an exemplary embodiment of the present invention. The customer can select the transmission summary control 1604 to display the exemplary transmission summary user interface 1800. Initially, the customer enters a process date in the text box 1802 and selects the view list control 1803. The process date comprises the date on which the processing module 214 accepted the ACH files, batches, and items.

In response to entering a process date in the text box 1802, the search module 218 searches the record table 213 to identify ACH files, batches, and items matching the process date for the customer and communicates the matching ACH files, batches, and items to the file tracking module 202 for presentation to the customer. The file tracking module 202 presents a summary list 1804 of the customer's ACH files, batches, and items that match the query.

The summary list 1804 comprises links 1806 to the respective rejected, pended, or accepted ACH files, batches, and items. By selecting one of the links 1806, the customer can link to a user interface that displays more detailed information for the selected ACH file, batch, or item.

For example, if the customer selects the rejected batches link 1806, then the file tracking module 202 can present a rejected batch user interface.

Figure 19:
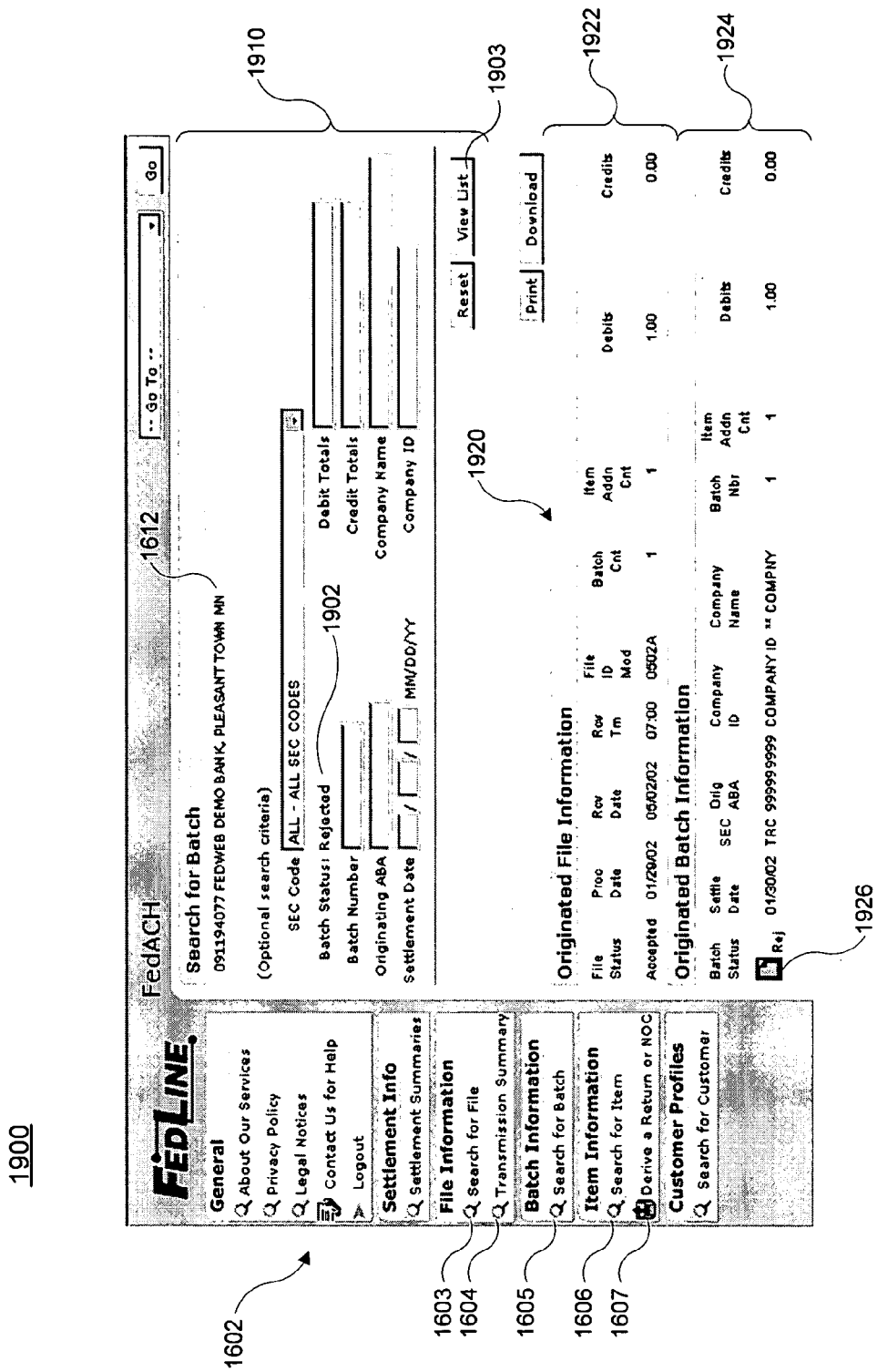
FIG. 19 illustrates a rejected batch user interface for presenting information about rejected batches transmitted during a selected process date according to an exemplary embodiment of the present invention.

FIG. 19 illustrates a rejected batch user interface 1900 presenting information about rejected batches transmitted during a selected process date according to an exemplary embodiment of the present invention. As illustrated in FIG. 19, the rejected batch user interface 1900 comprises a batch search window 1910 in which the customer can enter search criteria for changing the batch information presented in the rejected batch user interface 1900. When linking to the rejected batch search user interface 1900 via the transmission summary user interface 1800, the batch search window 1910 can be completed automatically by the file tracking module 202. As illustrated in FIG. 19, because the customer linked to the rejected batch user interface 1900 via the rejected batch link 1806, the batch status 1902 of the presented batches is "rejected."

The rejected batch user interface 1900 comprises file information 1922 for the ACH file comprising the rejected ACH batch. The rejected batch user interface 1900 also comprises batch information 1924 presenting information about a rejected batch within the ACH file. The batch information 1924 comprises a batch status icon 1926. The customer can select the batch status icon 1926 to link to detailed information regarding the status of the rejected batch.

Figure 20:
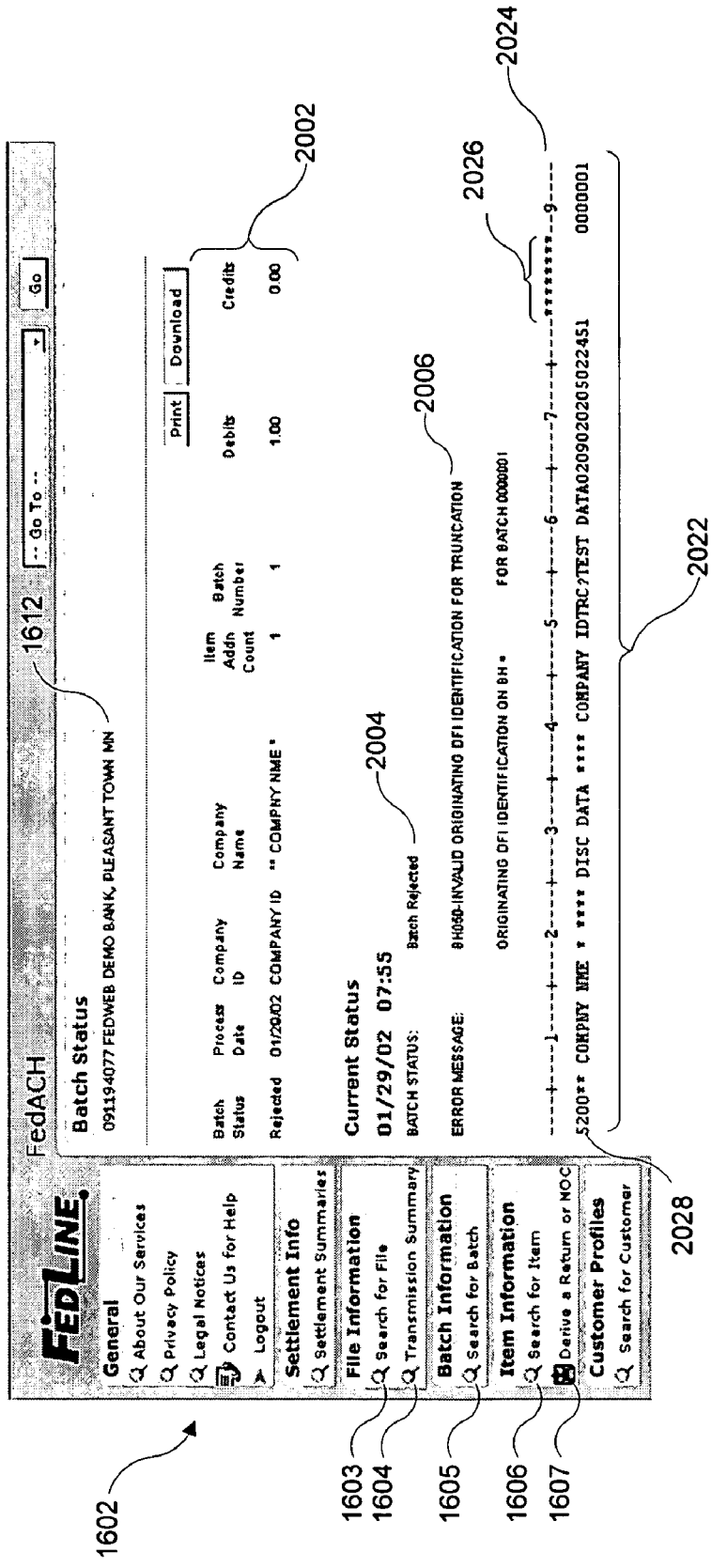
FIG. 20 illustrates a batch status user interface for presenting the status of a selected batch according to an exemplary embodiment of the present invention.

FIG. 20 illustrates a batch status user interface 2000 for presenting the status of a selected batch according to an exemplary embodiment of the present invention. Upon selection of the batch status icon 1926 in the rejected batch user interface 1900, the file tracking module 202 can present the batch status user interface 2000 to the customer. The batch status user interface 2000 comprises batch information 2002 identifying the specific batch for which the status information is provided. The batch status user interface 2000 also comprises a current status 2004 of the ACH batch. As illustrated in FIG. 20, the current status 2004 of the ACH batch is "batch rejected."

If header information of the selected ACH batch includes any errors, then the batch status user interface 2000 also can present an error ruler 2022 that graphically depicts the location of the error within the required batch header information. In an exemplary embodiment, the error ruler 2022 can comprise a continuous string of data locations 2024 that each represents a character of required NACHA information. In the exemplary embodiment illustrated in FIG. 20, the error ruler 2022 comprises a continuous string of ninety-four data locations 2024. Each data location on the continuous string 2024 must include the required NACHA information in the proper format, or the processing module 214 will reject the associated batch.

The error ruler 2022 can present the correct header information 2028 on the error ruler 2022 in the appropriate locations corresponding to the proper locations in the required NACHA information. The error ruler 2022 also can comprise highlighted locations of erroneous header information 2026 on the error ruler 2022. The error locations 2026 can be highlighted by color, asterisks, or other suitable highlighting means. As illustrated in FIG. 20, an error exists for characters 80-87 of the NACHA information. Accordingly, the customer can review the NACHA regulations to determine the exact information required for characters 80-87. Then, the customer can provide accurate information for characters 80-87 to correct the error.

The batch status user interface 2000 also can comprise an error message 2006 for presenting a reason code or description of the batch errors depicted in the error ruler 2022.

Figure 21:
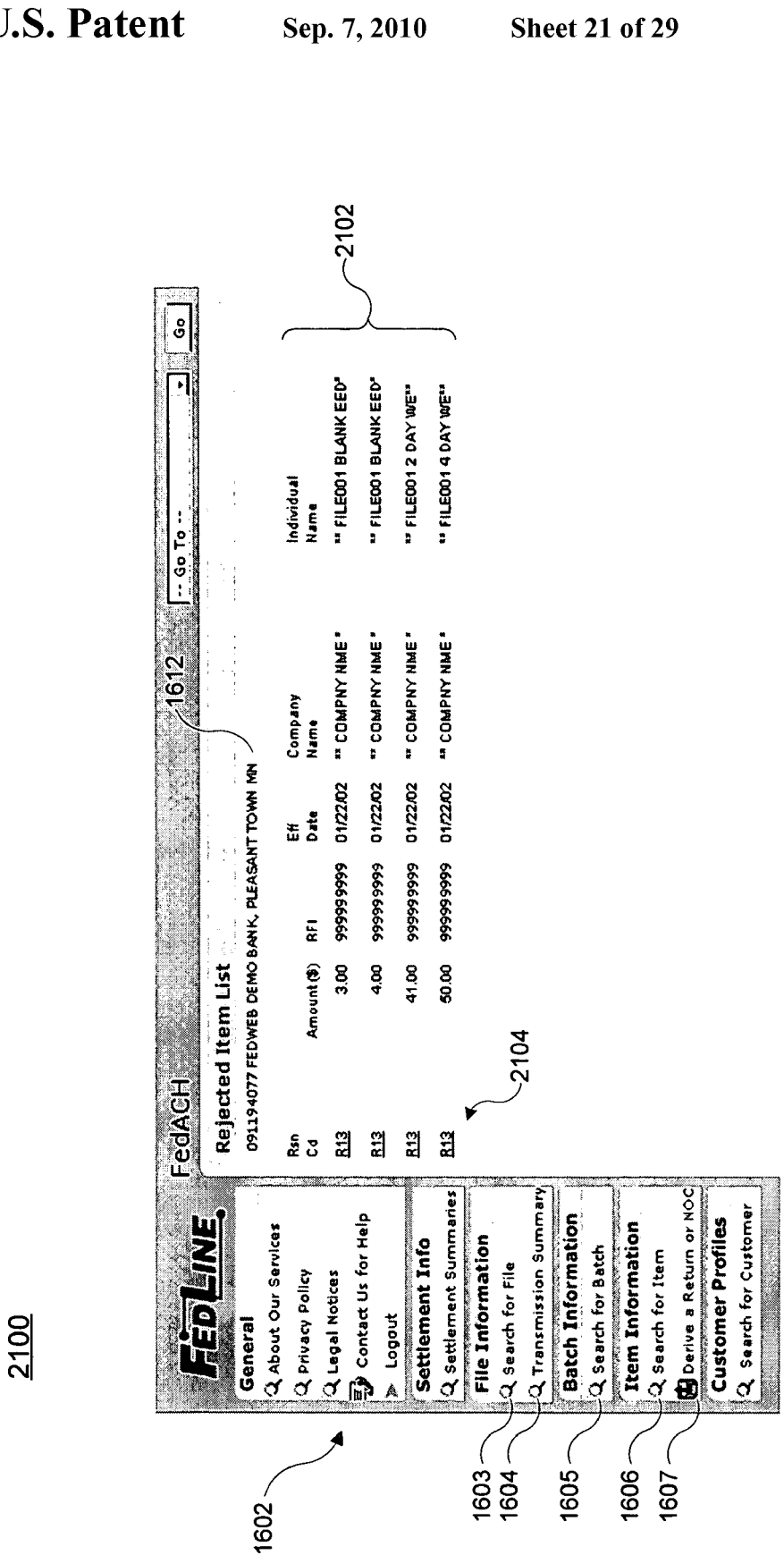
FIG. 21 illustrates a rejected item list user interface for presenting a list of rejected ACH items according to an exemplary embodiment of the present invention.

Referring back to FIG. 18, if the customer selects the rejected items link 1806 from the transmission summary user interface 1800, then the file tracking module 202 can present a rejected item list user interface. FIG. 21 illustrates a rejected item list user interface 2100 for presenting a list of rejected ACH items according to an exemplary embodiment of the present invention. As illustrated in FIG. 21, the rejected item list user interface 2100 comprises a list 2102 of the customer's of rejected items. The list 2102 comprises links 2104 to item detail summaries for each individual rejected item. For example, if the user selects one of the links 2104, then the file tracking module 202 can present an item detail summary user interface for the selected item.

Figure 22:
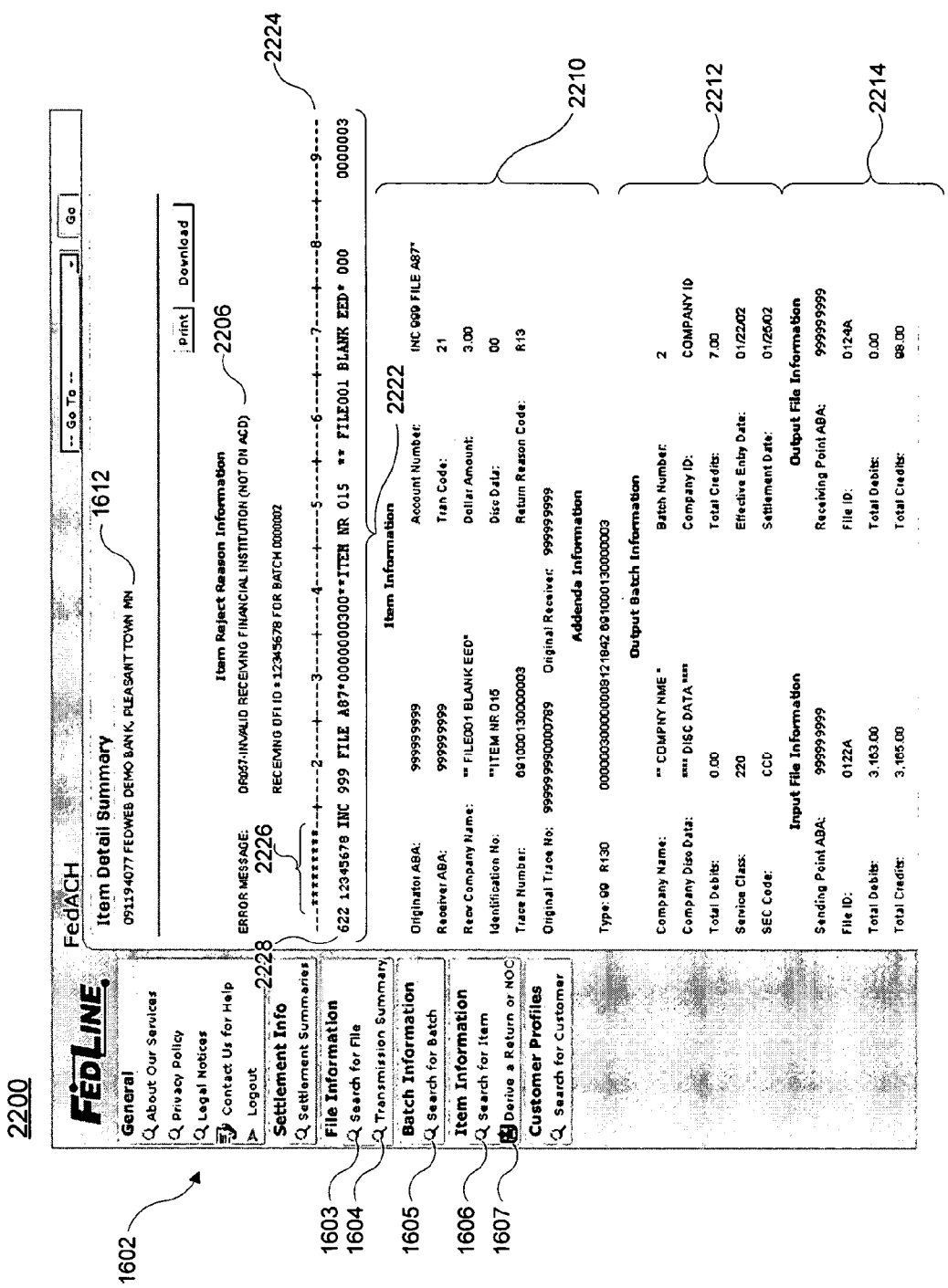
FIG. 22 illustrates an item detail summary user interface for presenting detailed ACH item information according to an exemplary embodiment of the present invention.

FIG. 22 illustrates an item detail summary user interface 2200 for presenting detailed ACH item information according to an exemplary embodiment of the present invention. As illustrated in FIG. 22, the item detail summary user interface 2200 comprises item information 2210 about the selected ACH item. The item detail summary user interface 2200 also comprises batch information 2212 for the batch that includes the selected item and file information 2214 for the file that includes the batch.

If detail record information of the selected ACH item includes any errors, then the item detail summary user interface 2200 also can present an error ruler 2222 that graphically depicts the location of the error within the required item detail record. In an exemplary embodiment, the error ruler 2222 can comprise a continuous string of data locations 2224 that each represents a character of required NACHA information. In the exemplary embodiment illustrated in FIG. 22, the error ruler 2222 comprises a continuous string of ninety-four data locations 2224. Each data location on the continuous string 2224 must include the required NACHA information in the proper format, or the processing module 214 will reject the associated item.

The error ruler 2222 can present the correct information 2228 on the error ruler 2222 in the appropriate locations corresponding to the proper locations in the required NACHA information. The error ruler 2222 also can comprise highlighted locations of erroneous information 2226 on the error ruler 2222. The error locations 2226 can be highlighted by color, asterisks, or other suitable highlighting means. As illustrated in FIG. 22, an error exists for characters 4-12 of the NACHA information. Accordingly, the customer can review the NACHA regulations to determine the exact information required for characters 4-12. Then, the customer can provide accurate information for characters 4-12 to correct the error.

The item detail summary user interface 2200 also can comprise an error message 2206 for presenting a reason code or description of the errors depicted in the error ruler 2222.

FIG. 23 illustrates a search for batch user interface 2300 for searching for and presenting ACH batch information according to an exemplary embodiment of the present invention. Upon selection of the search for batch control 1605 from the menu 1602, the file tracking module 202 can present the search for batch user interface 2300.

As illustrated in FIG. 23, the search for batch user interface 2300 comprises a batch search window 2310 in which the customer can input search criteria for identifying ACH batches. For example, the customer can select one of the originated or received radio button controls 2314 to focus the search on originated or received ACH batches, respectively. Additionally, the customer can input other information into the fields in the batch search window 2310 to focus the search.

After inputting the search criteria, the customer selects the view list control 2312. In response, the search module 218 searches the record table 213 for ACH batches that match the search criteria. Then, the search module 218 communicates the matching batch information to the file tracking module 202 for presentation to the customer in a batch search results window 2320.

The batch search results window 2320 comprises file information 2322 for the file that comprises the batches matching the search criteria. The batch search results window 2320 also comprises batch summary information 2324 for each batch that matches the search criteria. The batch summary information 2324 comprises status icons 2326 indicating the current status of respective batches. The status icons 2326 also comprise links to detailed status information for the respective batches. The batch summary information 2324 also comprises item count links 2328 to link to the individual items within the respective batches.

By selecting one of the batch status icons 2326, the user can link to a batch status user interface to obtain detailed status information for the respective batch. In an exemplary embodiment, the batch status user interface can comprise the batch status user interface 2000 discussed previously with reference to FIG. 20.

By selecting one of the item count links 2328, the customer can link to an item list user interface to obtain a list of the respective items. In an exemplary embodiment, the item list user interface can comprise an interface similar to the rejected item list user interface 2100 described previously with reference to FIG. 21.

Referring back to FIG. 16, the customer can select a search for item control 1606 to search for individual ACH items. In response, the file tracking module 202 can present a search for item user interface. FIG. 24 illustrates a search for item user interface 2400 for searching for and presenting ACH items according to an exemplary embodiment of the present invention.

Upon selection of the search for item control 1606, the file tracking module 202 can present an item search entry window 2410. The customer can input search criteria into the item search entry window 2410 to limit the search for ACH items. As illustrated in FIG. 24, the customer can select one of the originated and received radio button controls 2414 to focus the item search for originated or received items, respectively. The customer also can input other search criteria into the fields illustrated in the exemplary item search entry window 2410. After entering all of the desired search criteria in the item search entry window 2410, the customer selects the view list control 2412.

In response, the search module 218 searches the record table 213 for ACH items that match the search criteria and communicates matching ACH items to the file tracking module 202. The file tracking module 202 presents an individual item summary information window 2420 that lists the matching ACH items. The individual item summary information window 2420 comprises links 2426 to detailed item information for the respective ACH items. The user can link to an item detail summary user interface 2200 discussed previously to obtain detailed status information for an ACH item by selecting the corresponding link 2426 for the ACH item.

Figure 25:
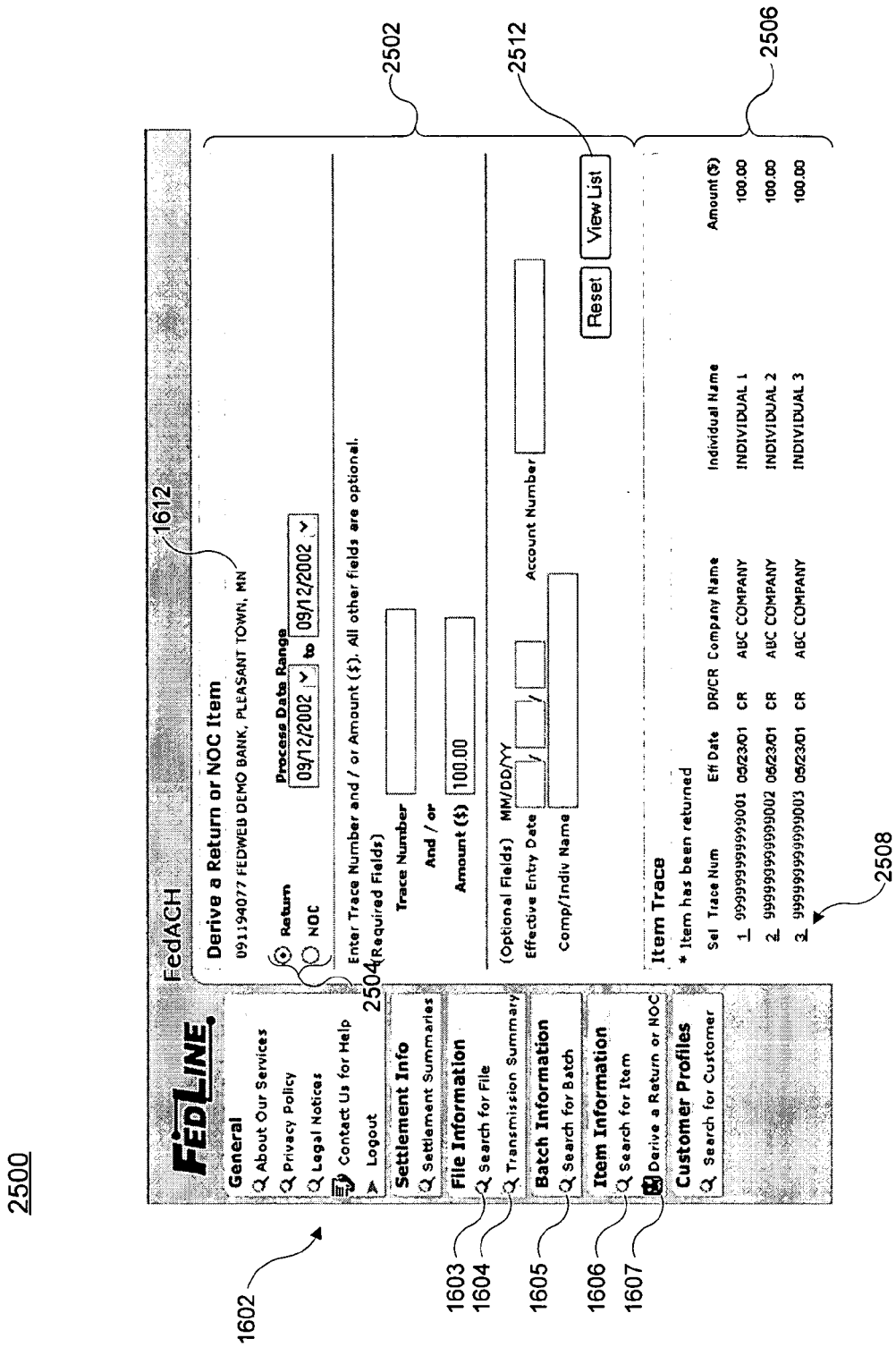
FIG. 25 illustrates a return/NOC user interface for deriving an ACH item return or NOC according to an exemplary embodiment of the present invention.
Figure 26:
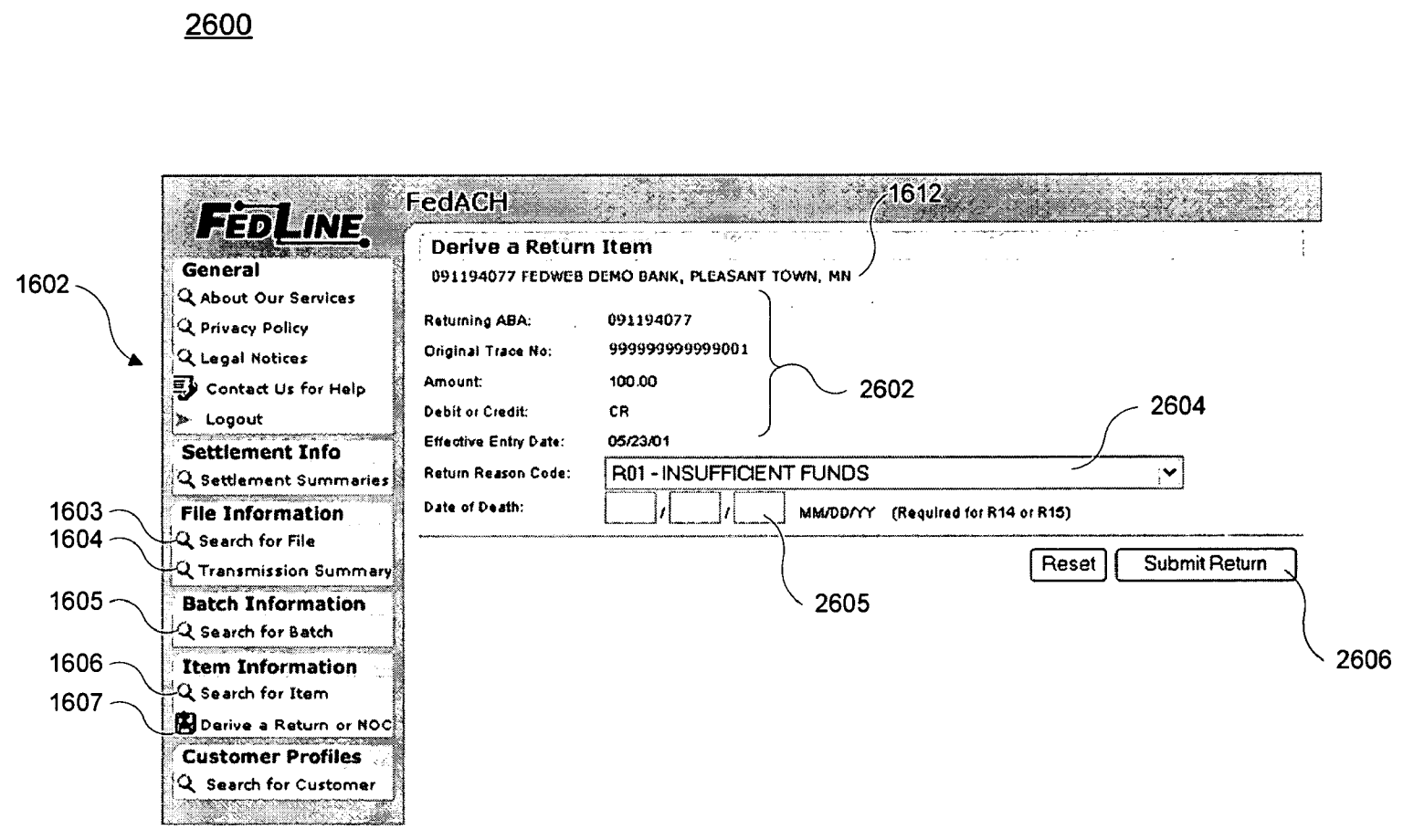

Exemplary user interfaces for deriving a return or notice of change ("NOC") item will now be described with reference to FIGS. 25 and 26. FIG. 25 illustrates a return/NOC user interface 2500 for deriving an ACH item return or NOC according to an exemplary embodiment of the present invention. A customer can return an ACH item for several reasons. For example, the customer may return an ACH item for insufficient funds, account closed, incorrect information in the transaction, or other suitable reason. Additionally, the customer can send a notice of change for an ACH item for several reasons. For example, the customer can send an NOC for a change of the account-holder's name, address, or account number, the bank's routing number, or other suitable reason.

Referring to FIG. 25, upon selection of the derive a return or NOC control 1607, the return/NOC module 206 presents an item search window 2502. The customer can input search criteria in the item search window 2502 to search for an ACH item for return or NOC. As illustrated in FIG. 25, the item search window 2502 comprises return and NOC radio button controls 2504. The customer can select the appropriate radio control 2504 to specify whether the item will be a return or NOC.

After entering the search criteria in the item search window 2502, the customer selects the view list control 2512. In response, the search module 218 searches the record table 213 for items that match the search criteria and communicates the matching items to the return/NOC module 206. The return/NOC module 206 presents the matching items in an ACH item results list 2506. The results list 2506 comprises links 2508 to a derive a return/NOC user interface for generating the return or NOC for the selected ACH item.

For example, if the customer selects one of the links 2508 from the results list 2506, the return/NOC module 206 can present a data entry user interface to derive an ACH return item based on the selected item corresponding to the selected link 2508. An exemplary data entry user interface will be described with reference to FIG. 26. FIG. 26 illustrates a data entry user interface 2600 for deriving an ACH return item according to an exemplary embodiment of the present invention. The return/NOC module 206 automatically fills in the customer information 1612 and the item information 2602. The customer selects or enters a return reason code in the return reason code field 2604 and can enter a date of death in the corresponding fields 2605. After entering the information in fields 2604, 2605, the customer selects the submit return control 2606.

In response, the return/NOC module 206 generates ACH item detail record information for the return item, generates ACH batch header information for a batch comprising the return item, generates ACH file header information for an ACH file comprising the ACH batch, and communicates the generated ACH file to the processing module 214 for processing.

The present invention can provide a similar user interface and process for deriving a notice of change item. Additionally, user interfaces similar to the exemplary user interfaces 2500, 2600 can be used to dishonor a returned item and to contest a dishonored return item.

Figure 27:
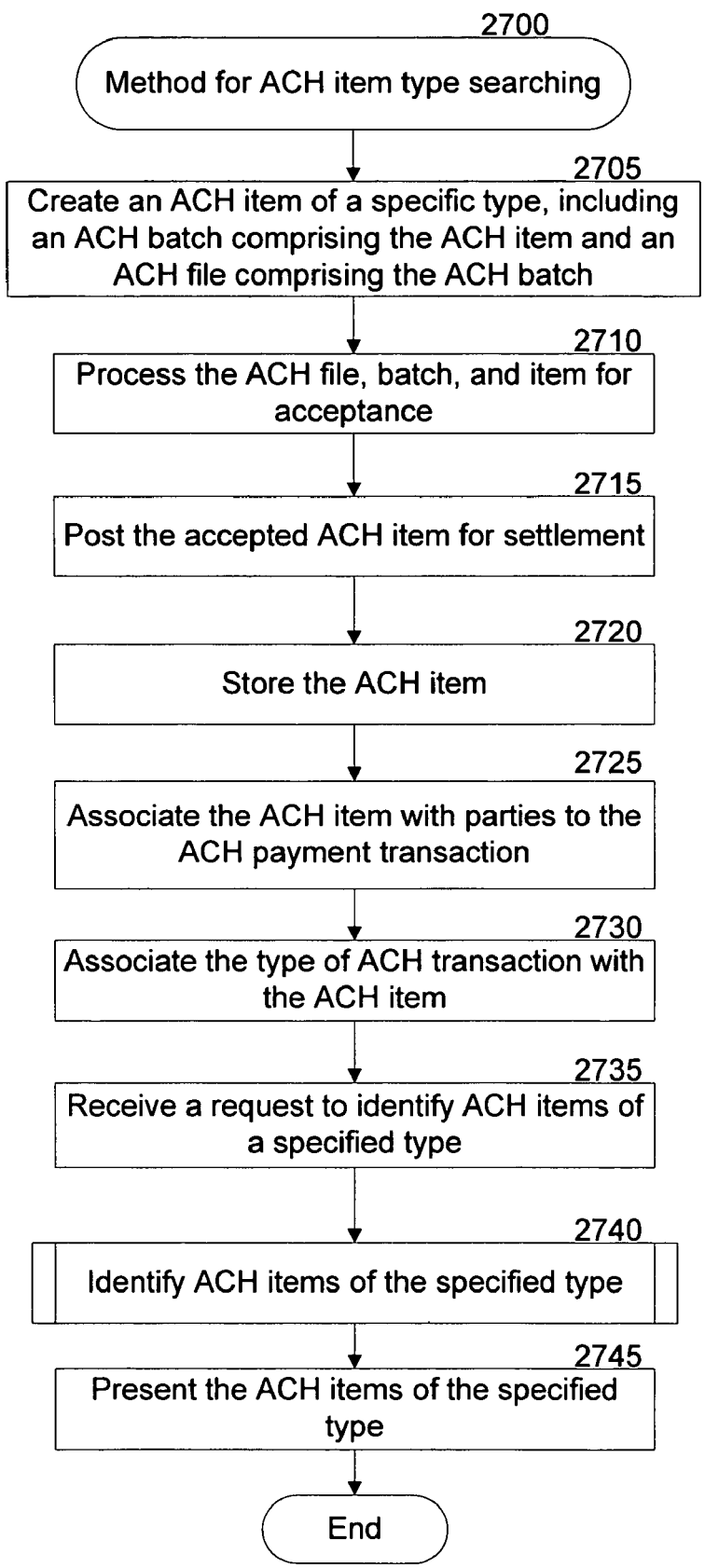
FIG. 27 is a flowchart depicting a method for ACH item type searching according to an exemplary embodiment of the present invention.

FIG. 27 is a flowchart depicting a method 2700 for ACH item type searching according to an exemplary embodiment of the present invention. The method 2700 will be described with reference to FIGS. 1, 2, and 27. In step 2705 of FIG. 27, the sending customer 102 creates an ACH item of a specific type of ACH transaction. In exemplary embodiments, the types of ACH transactions can comprise a return, a dishonored return, a contested dishonored return, an international return, a notification of change, and a refused notification of change.

In an exemplary embodiment, the sending customer 102 can create the ACH item of the specific transaction type in a conventional manner by creating an ACH file that comprises an ACH batch that comprises the ACH item of the specific transaction type. In that case, the sending customer 102 communicates the ACH file to the ACH operator 106 via the Internet 108, as previously discussed in step 310 of FIG. 3. In alternative exemplary embodiments, the sending customer 102 can create the ACH item of the specific transaction type via the methods 1300 and 1400 previously discussed with reference to FIGS. 13 and 14. ACH items created via the methods 1300 and 1400 are called "derived" items. In another alternative exemplary embodiment, the sending customer 102 can create the ACH item of the specific transaction type via a conventional interactive voice response system.

Regardless of the method used to create the ACH item of the specific transaction type, the NACHA formatted item detail record of the ACH item and the batch header record of the associated ACH batch can include information that indicates the specific type of ACH transaction for the ACH item.

In step 2710, the ACH operator 106 processes the ACH item of the specific type for acceptance. In that regard, the processing module 214 of the mainframe computer 112 processes the ACH file comprising the ACH batch for acceptance, processes the ACH batch comprising the ACH item of the specific type for acceptance, and processes the ACH item of the specific type for acceptance, as previously discussed with reference to FIGS. 6, 8, and 9.

After accepting the ACH item of the specific type, in step 2715, the processing module 214 posts the accepted ACH item for settlement at the next settlement time. At the next settlement time, the processing module 214 debits and credits the appropriate accounts to settle the ACH item.

In step 2720, the processing module 214 stores the accepted ACH item of the specific type in the file database 216. Then, in step 2725, the processing module 214 associates the ACH item of the specific type with the parties to the ACH payment transaction detailed by the ACH item. In an exemplary embodiment, the processing module 214 can associate parties with the ACH item by indexing the parties' routing numbers or other identification numbers to the stored ACH item in the file database 216. In exemplary embodiments, the parties to the ACH transaction can comprise the sending customer 102 and the receiving customer 114.

Next, in step 2730, the processing module 214 associates in the file database 216 the specific type of ACH transaction with the ACH item. In an exemplary embodiment, the processing module 214 can associate the specific transaction type with the ACH item by indexing the transaction type to the ACH item stored in the file database 216. In another exemplary embodiment, the processing module 214 can associate the transaction type with the ACH item by storing the NACHA formatted item detail record, or a portion of that record, with the ACH item stored in the file database 216.

The steps 2705-2730 can be repeated as needed to build the contents of the file database 216. In that case, the file database 216 can comprise multiple ACH items, each associated with its involved parties and specific ACH transaction type.

In step 2735, the search module 218 of the mainframe computer 112 receives a request from one of the parties to the ACH item transaction to provide information regarding ACH items of a specified type. In an exemplary embodiment, the party that created the ACH item of the specific type in step 2705 is the customer that communicates the request in step 2735. In another exemplary embodiment, any party to the transaction can communicate such a request for information regarding ACH items of a specified type. The request can comprise criteria to identify the ACH items of the specified type. For example, the request can comprise criteria to identify all of the requesting customer's ACH items that match one or more of the transaction types. For instance, the request criteria can seek all types of items associated with the requesting customer. Alternatively, the request criteria can seek only one of the types of items, or any combination of the types of items, associated with the requesting customer. The request criteria also can comprise a date range for the items. In exemplary embodiments, the date range can comprise a specified date range, a processing date, a settlement date, or other suitable time period.

In step 2740, the search module 218 searches the file database 216 for the requesting customer's ACH items of the specified type to identify stored ACH items associated with the requesting customer and associated with the specified type of ACH transaction. Step 2740 will be discussed in more detail below with reference to FIG. 29.

Then, in step 2745, the search module 218 communicates information regarding the identified ACH items to the operator server 110, which presents the information regarding the identified ACH items to the requesting customer via the Internet 108. In an exemplary embodiment, the information for the ACH items presented to the requesting customer can comprise a reference number, processing date, trace number, settlement date, company name, individual account holder name, individual account holder number, an indication of whether the item is an ACH debit or credit payment, and/or an amount of the item. The information also can comprise a summary total that indicates a total amount of all items that match the criteria specified in the search request.

Accordingly, the method 2700 can allow a requesting customer to receive information regarding specified types of ACH items. By limiting the searching capabilities of the requesting customer, the method 2700 can provide a meaningful set of search results to the requesting customer. The meaningful set of search results can comprise only those ACH items of the specified type.

Figure 29:
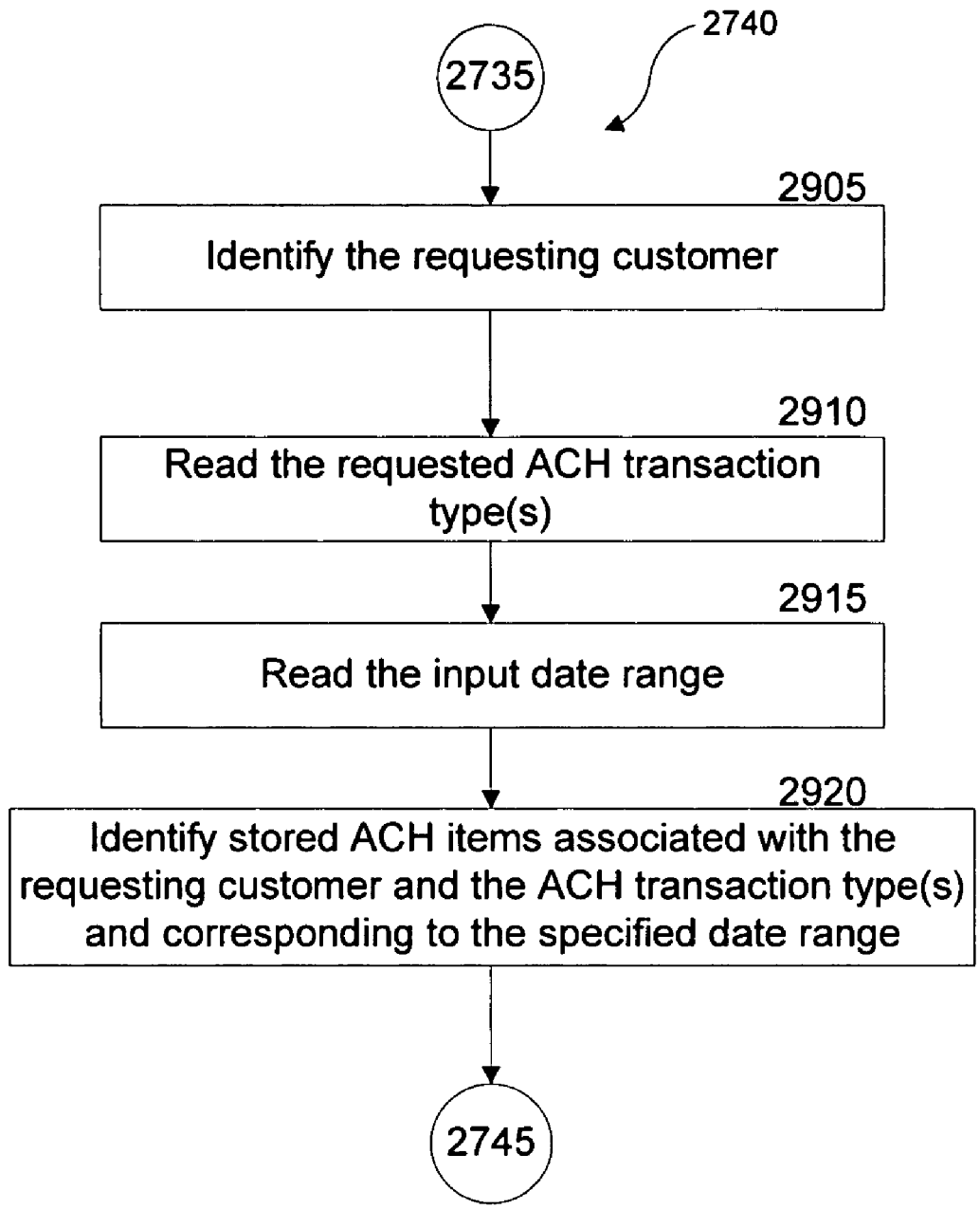
FIG. 29 is a flowchart depicting a method for identifying ACH items according to an exemplary embodiment of the present invention.

FIG. 29 is a flowchart depicting a method 2740 for identifying ACH items according to an exemplary embodiment of the present invention, as referenced in step 2740 of FIG. 27. In step 2905, the search module 218 identifies the requesting customer. In an exemplary embodiment, the search module 218 can perform that task by referencing the requesting customer's routing number or other identification number. In step 2910, the search module 218 reads the type(s) of ACH transactions specified in the search request. In step 2915, the search module 218 reads the date range specified in the search request. Then, in step 2920, the search module 218 identifies ACH items stored in the file database 216 which are associated with the requesting customer, are associated with the specified ACH transaction type(s), and correspond to the specified date range. The method 2740 then proceeds to step 2745 (FIG. 27).

Figure 28:
FIG. 28 illustrates an ACH item type search user interface for allowing a customer to search for processed ACH items based on ACH transaction type according to an exemplary embodiment of the present invention.

An exemplary user interface for performing embodiments of the method 2700 will be described below with reference to FIG. 28. FIG. 28 illustrates an ACH item type search user interface 2800 for allowing a customer to search for processed ACH items based on a type of ACH transaction according to an exemplary embodiment of the present invention. As illustrated in FIG. 28, the item type search user interface 2800 comprises the menu 1602 from which the customer can select a file tracking and reporting option. To view the exemplary item type search user interface 2800, the customer selects the "list derived returns or NOCs" control 2808 from the menu 1602.

The item type search user interface 2800 comprises a search entry window 2810 in which the customer can input search criteria for identifying ACH items based on ACH transaction type. The item type search entry window 2810 comprises a customer information field 2812, which the operator server 110 automatically can populate based on the login information provided by the customer.

The customer can focus the search for return items or NOC items or both types of items by selecting one of the button controls 2814 in the search entry window 2810. In the exemplary embodiment of FIG. 28, the customer has selected the "Return" button control 2814. The "Return" button control 2814 illustrated in the exemplary embodiment of FIG. 28 encompasses all types of returns, such as a return, a dishonored return, a contested dishonored return, and an international return. Additionally, the "NOC" button control 2814 illustrated in the exemplary embodiment of FIG. 28 encompasses all types of NOC items, such as a notification of change and a refused notification of change. The present invention is not limited to the exemplary embodiment illustrated in FIG. 28. In other exemplary embodiments (not shown), the button controls 2814 can comprise a control for each of the different types of returns, NOCs, or other ACH transaction types, as well as different combinations of returns and NOCs. Additionally, the customer can enter a date range in the date fields 2816 of the search entry window 2810 to focus the item type search.

After entering the information in the item type search entry window 2810, the customer selects the view list button 2818 to display the item type search results window 2820, which presents information regarding the customer's ACH items that match the criteria input into the item type search entry window 2810. As illustrated in FIG. 28, the item type search results window 2820 comprises a listing of the requesting customer's return items, dishonored return items, contested dishonored return items, and international return items, based on the customer's selection of the "Return" button control 2814 in the search entry window 2810. The window 2820 also comprises a summary section that lists the grand total of credits and debits for all listed items. The information provided in the window 2820 for each listed item comprises a reference number, processing date, trace number, settlement date, company name, individual account holder name, individual account holder number, an indication whether the item is a debit payment or a credit payment, and an amount.

The exemplary item type search results window 2820 illustrated in FIG. 28 lists "Web Derived" return ACH items, which the customer derived using the methods 1300 and 1400 described in FIGS. 13 and 14. The present invention is not limited to web derived items. In other exemplary embodiments, the item type search results window 2820 can list types of ACH items that are created locally by the customer or are created via an interactive voice response system. The method 2700 embodied in the user interface 2800 can identify ACH items based on the type of transaction, regardless of the method used to create the items.

The present invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

What is claimed is:

1. A computer-implemented method for identifying automated clearing house ("ACH") transaction items processed by an ACH operator, comprising the steps of:
   storing a plurality of ACH items by the ACH operator, each item related to one of a plurality of ACH transaction types;
   receiving, by a search module, a request for information regarding at least one ACH item related to a specified one of the ACH transaction types;
   identifying, by the search module, matching ACH items that are related to the specified one of the ACH transaction types in response to receiving the request; and
   presenting information regarding the matching ACH items,
   wherein the search module is implemented in a computer system that comprises instructions stored in a machine-readable medium and a processor that executes the instructions.

2. The computer-implemented method according to claim 1, wherein said identifying step comprises the step of associating each ACH item with a corresponding one of the ACH transaction types to which it is related and identifying matching ACH items that are associated with the specified one of the ACH transaction types.

3. The computer-implemented method according to claim 1, further comprising the step of processing the ACH items for acceptance by the ACH operator.

4. The computer-implemented method according to claim 1, wherein the ACH transaction types comprise at least two of an ACH notification of change, an ACH refused notification of change, an ACH return, an ACH dishonored return, an ACH contested dishonored return, and an ACH international return.

5. The computer-implemented method according to claim 1, further comprising the step of associating parties involved with the transaction represented by each ACH item with each respective ACH item,
   wherein the request is received in said receiving step from a requesting party involved with at least one of the ACH items, and
   wherein said identifying step comprises identifying matching ACH items associated with the requesting party.

6. The computer-implemented method according to claim 1, wherein the request comprises a date range, and
   wherein said identifying step comprises identifying matching ACH items that correspond to the date range.

7. The computer-implemented method according to claim 6, wherein the date range comprises one of a date upon which the matching ACH items were settled and a date upon which the matching ACH items were processed.

8. The computer-implemented method according to claim 1, further comprising the step of creating each of the ACH items.

9. The computer-implemented method according to claim 8, wherein said creating step comprises deriving at least one of the ACH items via the ACH operator.

10. The computer-implemented method according to claim 1, further comprising the step of storing the ACH items and the associated ACH transaction types.

11. A computer-readable medium having embodied therein a set of computer-executable instructions that when executed cause a computer to implement a process of identifying automated clearing house ("ACH") transaction items processed by an ACH operator, the process comprising the steps of:
   storing a plurality of ACH items by the ACH operator, each item related to one of a plurality of ACH transaction types;
   receiving a request for information regarding at least one ACH item related to a specified one of the ACH transaction types;
   identifying matching ACH items that are related to the specified one of the ACH transaction types in response to receiving the request; and
   presenting information regarding the matching ACH items.

12. A system for identifying automated clearing house ("ACH") transaction items processed by an ACH operator, comprising:
   a processing module that processes a plurality of ACH items for acceptance by the ACH operator, each item related to an ACH transaction type comprising one of an ACH notification of change, an ACH refused notification of change, an ACH return, an ACH dishonored return, an ACH contested dishonored return, and an ACH international return;
   a file database that associates each ACH item with a corresponding ACH transaction type to which it is related; and
   a search module that receives from a requesting customer a request for information regarding a specified one of the ACH transaction types, and that identifies matching ACH items associated with the specified ACH transaction type in response to receiving the request.

13. The system according to claim 12, further comprising an operator server,
   wherein said search module communicates the matching ACH items to said operator server, and
   wherein said operator server receives the matching ACH items from said search module and presents the matching ACH items to the requesting customer.

14. The system according to claim 12, wherein said processing module associates involved parties with each respective ACH item, and
   wherein said search module receives the request from a requesting party involved with at least one of the ACH items and identifies matching ACH items associated with the requesting party and the specified ACH transaction type.

15. The system according to claim 12, wherein the request comprises a date range, and
   wherein said search module identifies matching ACH items that correspond to the date range and are associated with the specified ACH transaction type.

16. The system according to claim 15, wherein the date range comprises one of a date upon which the matching ACH items were settled and a date upon which the matching ACH items were processed.

17. The system according to claim 12, further comprising a return/notification of change module that derives at least one of the ACH items.

18. A computer-implemented method for identifying automated clearing house ("ACH") transaction items processed by an ACH operator, comprising the steps of:
   processing a plurality of ACH items for acceptance by the ACH operator, each ACH item comprising an ACH payment that is categorized as one of a plurality of ACH transaction types;
   storing the ACH items;
   associating parties involved with each ACH item with respective stored ACH items;
   associating each stored ACH item with a corresponding one of the ACH transaction types in which it is categorized;
   receiving, by a search module, a request from a requesting party for information regarding at least one of the ACH transaction types;
   searching, by the search module, the stored ACH items for matching ACH items that are categorized in the specified ACH transaction type and are associated with the requesting party; and
   presenting, by the search module, the matching ACH items to the requesting party,
   wherein the search module is implemented in a computer system that comprises instructions stored in a machine-readable medium and a processor that executes the instructions.

19. The computer-implemented method according to claim 18, wherein the ACH transaction types comprise at least two of an ACH notification of change, an ACH refused notification of change, an ACH return, an ACH dishonored return, an ACH contested dishonored return, and an ACH international return.

20. The computer-implemented method according to claim 18, wherein the request comprises a date range, and
   wherein said searching step comprises searching for matching ACH items that correspond to the date range.

21. The computer-implemented method according to claim 20, wherein the date range comprises one of a date upon which the matching ACH items were settled and a date upon which the matching ACH items were processed.

22. The computer-implemented method according to claim 18, further comprising the step of creating each of the ACH items.

23. The computer-implemented method according to claim 22, wherein said creating step comprises deriving at least one of the ACH items via the ACH operator.

24. A computer-readable medium having embodied therein a set of computer-executable instructions that when executed cause a computer to implement a process of identifying automated clearing house ("ACH") transaction items processed by an ACH operator, the process comprising the steps of:
   processing a plurality of ACH items for acceptance by the ACH operator, each ACH item comprising an ACH payment that is categorized as one of a plurality of ACH transaction types;
   storing the ACH items;
   associating parties involved with each ACH item with respective stored ACH items;

associating each stored ACH item with a corresponding one of the ACH transaction types in which it is categorized;

receiving a request from a requesting party for information regarding at least one of the ACH transaction types;

searching the stored ACH items for matching ACH items that are categorized in the specified ACH transaction type and are associated with the requesting party; and presenting the matching ACH items to the requesting party.

25. A computer-implemented method for identifying automated clearing house ("ACH") transaction items processed by an ACH operator, comprising the steps of:

communicating via a computer a plurality of ACH items to the ACH operator, each item related to one of a plurality of ACH transaction types;

communicating via the computer a request for information regarding at least one ACH item related to a specified one of the ACH transaction types; and receiving via the computer a response identifying matching ACH items that are associated with the specified one of the ACH transaction types in response to communicating the request.

26. The computer-implemented method according to claim 25, wherein the ACH transaction types comprise at least two of an ACH notification of change, an ACH refused notification of change, an ACH return, an ACH dishonored return, an ACH contested dishonored return, and an ACH international return.

27. The computer-implemented method according to claim 25, wherein the request comprises a date range, and wherein the response identifies matching ACH items that correspond to the date range.

28. The computer-implemented method according to claim 27, wherein the date range comprises one of a date upon which the matching ACH items were settled and a date upon which the matching ACH items were processed.

29. The computer-implemented method according to claim 25, wherein said communicating step comprises the step of creating each of the ACH items.

30. The computer-implemented method according to claim 29, wherein said creating step comprises deriving at least one of the ACH items via the ACH operator.

31. A computer-readable medium having embodied therein a set of computer-executable instructions that when executed cause a computer to implement a process of identifying automated clearing house ("ACH") transaction items processed by an ACH operator, the process comprising the steps of:

communicating a plurality of ACH items to, the ACH operator, each item related to one of a plurality of ACH transaction types;

communicating a request for information regarding at least one ACH item related to a specified one of the ACH transaction types; and receiving a response identifying matching ACH items that are associated with the specified one of the ACH transaction types in response to communicating the request.

* * * * *